(12) United States Patent
Yamashita et al.

(10) Patent No.: US 11,145,996 B2
(45) Date of Patent: Oct. 12, 2021

(54) ELECTRODE CONNECTION STRUCTURE AND ELECTRODE CONNECTION METHOD

(71) Applicant: Panasonic Intellectual Property Management Co., Ltd., Osaka (JP)

(72) Inventors: Yasuhiro Yamashita, Osaka (JP); Hiroki Eto, Osaka (JP); Hidenori Kitamura, Osaka (JP); Takumi Yamada, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/073,895

(22) Filed: Oct. 19, 2020

(65) Prior Publication Data

US 2021/0036438 A1  Feb. 4, 2021

Related U.S. Application Data

(63) Continuation of application No. PCT/JP2019/003172, filed on Jan. 30, 2019.

(30) Foreign Application Priority Data

Apr. 23, 2018 (JP) .............................. JP2018-082375
Oct. 31, 2018 (JP) .............................. JP2018-204579

(51) Int. Cl.
*H01R 4/06* (2006.01)
*H01R 4/30* (2006.01)
(Continued)

(52) U.S. Cl.
CPC ................. *H01R 4/06* (2013.01); *H01R 4/30* (2013.01); *B62D 1/06* (2013.01); *G01V 3/088* (2013.01)

(58) Field of Classification Search
None
See application file for complete search history.

(56) References Cited

U.S. PATENT DOCUMENTS 6,310,407 B1    10/2001  Saito et al.
10,843,720 B2 *  11/2020  Kwon ................ H03K 17/9622
(Continued)

FOREIGN PATENT DOCUMENTS

JP         2000-028742       1/2000

OTHER PUBLICATIONS

Official Communication issued in International Patent Application No. PCT/JP2019/003172, dated Mar. 26, 2019, along with an English translation thereof.

*Primary Examiner* — Ross N Gushi
(74) *Attorney, Agent, or Firm* — Greenblum & Bernstein, P.L.C.

(57) ABSTRACT

The electrode connection structure includes: a first base material; a first electrode layer and a second electrode layer that are located on the first base material; a second base material; a first fastening member and a second fastening member; and an insulating member, wherein the first fastening member includes: a shaft portion inserted in a first through hole penetrating the first electrode layer and the insulating member; and two clamping portions that clamp a periphery of the first through hole in each of the first electrode layer and the insulating member, and the second fastening member includes: a shaft portion inserted in a second through hole penetrating the second electrode layer and the insulating member; and two clamping portions that clamp a periphery of the second through hole in each of the second electrode layer and the insulating member.

18 Claims, 22 Drawing Sheets

(51) Int. Cl.
  *B62D 1/06* (2006.01)
  *G01V 3/08* (2006.01)

(56) References Cited

U.S. PATENT DOCUMENTS

| | | | |
|---|---|---|---|
| 2016/0377951 A1* | 12/2016 | Harris | G02F 1/13452 |
| | | | 359/296 |
| 2017/0254675 A1* | 9/2017 | Hein | G01L 1/142 |
| 2019/0036527 A1* | 1/2019 | Dolcetti | B60N 2/002 |
| 2020/0039559 A1* | 2/2020 | Aerts | H03K 17/962 |
| 2020/0062289 A1* | 2/2020 | Zoppas | B62D 1/065 |
| 2020/0255047 A1* | 8/2020 | Boittiaux | B62D 1/10 |

* cited by examiner

ELECTRODE CONNECTION STRUCTURE AND ELECTRODE CONNECTION METHOD

CROSS REFERENCE TO RELATED APPLICATION

This is a continuation application of PCT International Application No. PCT/JP2019/003172 filed on Jan. 30, 2019, designating the United States of America, which is based on and claims priority of Japanese Patent Application No. 2018-082375 filed on Apr. 23, 2018 and Japanese Patent Application No. 2018-204579 filed on Oct. 31, 2018.

BACKGROUND

1. Technical Field

The present disclosure relates to an electrode connection structure and the like for connecting a connection terminal to an electrode.

2. Description of the Related Art

Conventionally, an electrode connection structure for connecting a connection terminal to an electrode has been provided (see, for example, Japanese Unexamined Patent Application Publication No. 2000-28742 (Patent Literature (PTL) 1)). For example, in the electrode connection structure (that is, the electrode connection structure) in PTL 1, the connection terminal is electrically and mechanically connected to the base member on the surface of which the conductive cloth-like antenna electrodes are formed. Then, the cable is electrically and mechanically connected to the connection terminal. Here, in the connection between the base member and the connection terminal, the electrode portion, which is a part of the antenna electrodes protruding from the end of the base member, is folded back to the back surface of the base member, and the stacked portion made of three layers of the antenna electrode, the base member, and the electrode portion is elastically clamped to the connection terminal. Furthermore, the connection terminal has a pin portion inserted in a hole penetrating in the stacking direction of the stacked portion.

SUMMARY

However, the electrode connection structure according to PTL 1 can be improved upon.

In view of this, the present disclosure provides an electrode connection structure capable of improving upon the above related art.

An electrode connection structure according to an aspect of the present disclosure includes: a first base material; a first electrode layer and a second electrode layer that are located on one surface of the first base material; a second base material disposed on a surface opposite to the one surface of the first base material; a first fastening member that fastens one end of a first electric wire to the first base material and the second base material; a second fastening member that fastens one end of a second electric wire to the first base material and the second base material; and an insulating member, wherein the first fastening member includes: a first shaft portion inserted in a first through hole penetrating the first electrode layer, the first base material, the second base material, and the insulating member; and two first clamping portions disposed on the first shaft portion so as to clamp a periphery of the first through hole in each of the first electrode layer, the first base material, the second base material, and the insulating member in an axial direction of the first shaft portion, the second fastening member includes: a second shaft portion inserted in a second through hole penetrating the second electrode layer, the first base material, the second base material, and the insulating member; and two second clamping portions disposed on the second shaft portion so as to clamp a periphery of the second through hole in each of the second electrode layer, the first base material, the second base material, and the insulating member in an axial direction of the second shaft portion, the one end of the first electric wire is fixed to the first fastening member while being electrically connected to the first electrode layer, and the one end of the second electric wire is fixed to the second fastening member while being electrically connected to the second electrode layer.

It should be noted that these comprehensive or specific aspects may be implemented by any combination of systems, methods, or integrated circuits.

The electrode connection structure of the present disclosure is capable of improving upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
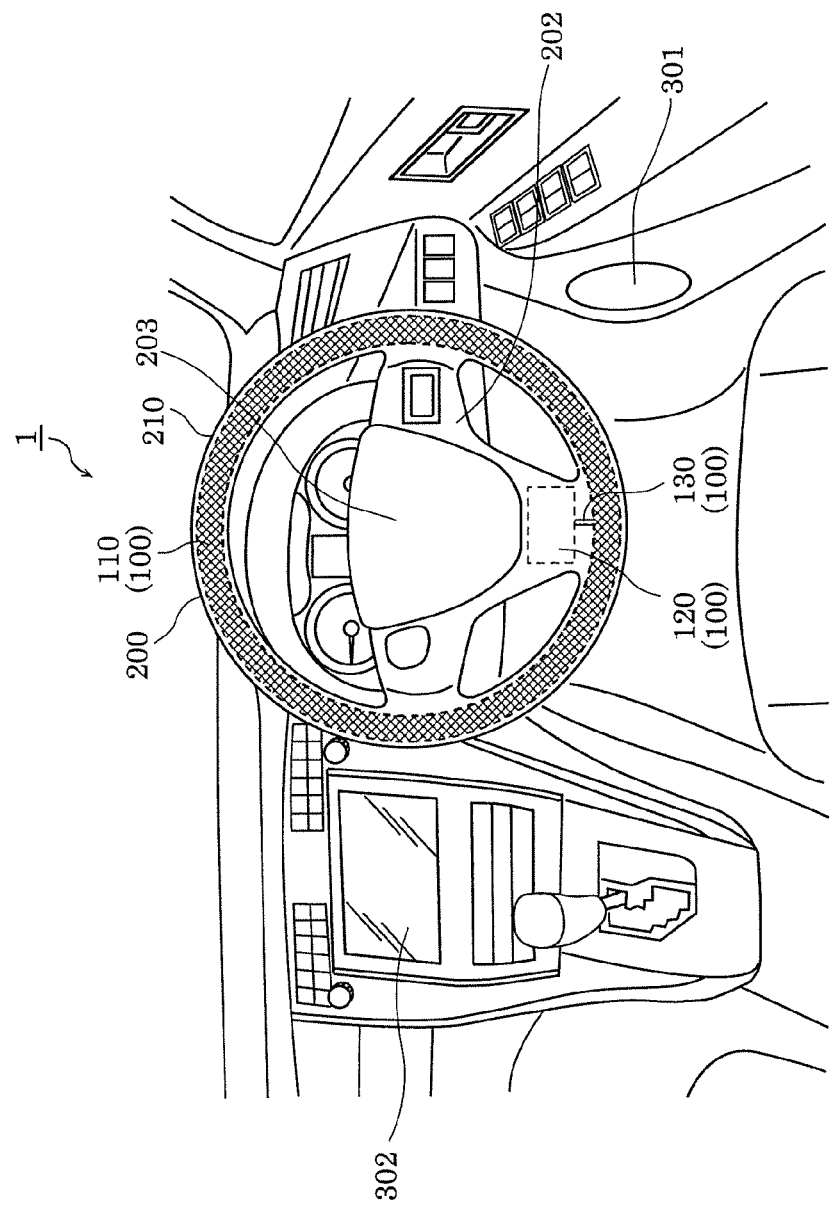
FIG. 1 is a diagram showing an example of a vehicle interior of a vehicle in which a grip sensor according to Embodiment 1 is disposed.

In the electrode connection structure of PTL 1, there is a problem in that when a cable is pulled, the stacked portion and the like is likely to be damaged. For example, when a sensor having an electrode connection structure is attached to a steering wheel of a vehicle, when the cable is pulled, a local tension is generated in a region or the like of a part of the antenna electrode that is around the pin portion connected to the cable. As a result, the antenna electrode or the like may be cracked or damaged. Therefore, the present disclosure provides an electrode connection structure or the like that is less likely to be damaged.

An electrode connection structure according to an aspect of the present disclosure includes: a first base material; a first electrode layer and a second electrode layer that are located on one surface of the first base material; a second base material disposed on a surface opposite to the one surface of the first base material; a first fastening member that fastens one end of a first electric wire to the first base material and the second base material; a second fastening member that fastens one end of a second electric wire to the first base material and the second base material; and an insulating member, wherein the first fastening member includes: a first shaft portion inserted in a first through hole penetrating the first electrode layer, the first base material, the second base material, and the insulating member; and two first clamping portions disposed on the first shaft portion so as to clamp a periphery of the first through hole in each of the first electrode layer, the first base material, the second base material, and the insulating member in an axial direction of the first shaft portion, the second fastening member includes: a second shaft portion inserted in a second through hole penetrating the second electrode layer, the first base material, the second base material, and the insulating member; and two second clamping portions disposed on the second shaft portion so as to clamp a periphery of the second through hole in each of the second electrode layer, the first base material, the second base material, and the insulating member in an axial direction of the second shaft portion, the one end of the first electric wire is fixed to the first fastening member while being electrically connected to the first electrode layer, and the one end of the second electric wire is fixed to the second fastening member while being electrically connected to the second electrode layer. For example, the insulating member may be a resin sheet. Alternatively, the insulating member may be a rubber sheet. Alternatively, the insulating member may be a non-woven fabric. Alternatively, the insulating member may be a metal sheet having an insulating surface.

With this, the insulating member is clamped together with the first base material and the second base material by the two first clamping portions of the first fastening member and the two second clamping portions of the second fastening member, so that the mechanical connection strength of the electrode connection structure can be increased, and the electrode connection structure can be made less prone to damage. That is, the insulating member is clamped together with the first base material and the like by the two first clamping portions of the first fastening member fixed to one end (specifically, the cable terminal) of the first electric wire such as a cable. Furthermore, the insulating member is also clamped together with the first base material and the like by the two second clamping portions of the second fastening member fixed to one end (specifically, the cable terminal) of the second electric wire such as another cable. Therefore, for example, when a force is applied to the first shaft portion of the first fastening member fixed to one end of the first electric wire by pulling the first electric wire (for example, a cable), the insulating member receives the tensile stress. Here, since the insulating member is also clamped together with the first base material, the second base material and the like by the second fastening member, the first base material and the second base material are reinforced, and the insulating member can suppress the movement of the first shaft portion of the first fastening member fixed to one end of the insulating member. Even if the second electric wire is pulled, the insulating member can similarly suppress the movement of the second shaft portion of the second fastening member fixed to one end of the second electric wire. As a result, it is possible to suppress the periphery of the first through hole in the first electrode layer, the first base material, and the second base material from being torn by the first shaft portion. Similarly, it is possible to suppress the periphery of the second through hole in the second electrode layer, the first base material, and the second base material from being torn by the second shaft portion.

In addition, the insulating member may be disposed between the second base material and one of the two first clamping portions and between the second base material and one of the two second clamping portions.

With this, since the insulating member is disposed as a cushioning material between (i) the second base material and (ii) the first clamping portion and the second clamping portion, even if the second base material is strongly pressed by the first clamping portion and the second clamping portion clamping the second base material, the local pressure on the second base material can be relieved.

In addition, the electrode connection structure further includes: a first metal wire and a second metal wire each fixed to the second base material, the two first clamping portions clamp the first metal wire fixed to the second base material in the axial direction of the first shaft portion together with the first electrode layer, the first base material, the second base material, and the insulating member, and the two second clamping portions may clamp the second metal wire fixed to the second base material in the axial direction of the second shaft portion together with the second electrode layer, the first base material, the second base material, and the insulating member.

With this, since the first metal wire fixed to the second base material is clamped together with the first base material and the like by the first fastening member, the mechanical connection strength of the electrode connection structure can be further increased, and the electrode connection structure can be made less prone to damage. That is, the first metal wire fixed to the second base material is clamped by the two first clamping portions of the first fastening member fixed to one end (specifically, the cable terminal) of the first electric wire such as a cable. Therefore, for example, when a force is applied to the first shaft portion of the first fastening member fixed to one end of the first electric wire by pulling the first electric wire (for example, a cable), the first metal wire receives the tensile stress. Here, since the first metal wire is fixed to the second base material, it reinforces the second base material, and the first metal wire can suppress the movement of the first shaft portion of the first fastening member fixed to one end of the first electric wire. As a result, the periphery of the through hole in the first electrode layer, the first base material, and the second base material can be suppressed from being torn by the first shaft portion. In addition, similarly to the first metal wire, the second metal wire fixed to the second base material is also clamped together with the first base material and the like by the second fastening member. Therefore, even with this second metal wire, the mechanical connection strength of the electrode connection structure can be further increased, and the electrode connection structure can be made less prone to damage.

It should be noted that the first metal wire and the second metal wire may be the same metal wire or may be electrically insulated metal wires different from each other.

In addition, the first base material includes a first main base material and a first convex portion protruding from the first main base material, the second base material includes a second main base material facing the first main base material, and a second convex portion protruding from the second main base material and facing the first convex portion, each of the first electrode layer and the second electrode layer is disposed over a range including at least a part of the first main base material and at least a part of the first convex portion, the first shaft portion of the first fastening member is inserted in the first through hole penetrating the first electrode layer, the first convex portion, the second convex portion, and the insulating member, the second shaft portion of the second fastening member is inserted in the second through hole penetrating the second electrode layer, the first convex portion, the second convex portion, and the insulating member, and the first metal wire and the second metal wire may be fixed to the second main base material.

With this, since the first metal wire and the second metal wire are fixed to the second main base material, even if the first electric wire or the second electric wire is pulled, it is possible to suppress the first convex portion and the second convex portion from being torn from the first main base material and the second main base material.

In addition, each of the first metal wire and the second metal wire includes a substantially U-shaped folded-back portion, both ends of the folded-back portion are fixed to the second main base material, a central portion of the folded-back portion is fixed to the second convex portion, and the first shaft portion of the first fastening member or the second shaft portion of the second fastening member may be disposed inward of the folded-back portion.

With this, since the first shaft portion or the second shaft portion is disposed inward of the folded-back portion, even if a strong outward force is applied to the first shaft portion or the second shaft portion by pulling the first electric wire or the second electric wire, it can sufficiently withstand the force by the substantially U-shaped folded-back portion. As a result, the mechanical connection strength of the electrode connection structure can be further increased.

In addition, each of the first metal wire and the second metal wire having an electrically insulated surface may be a heater element that generates heat by a current flowing through the metal wire to warm the electrode connection structure.

With this, when the electrode connection structure is, for example, attached to a rim of a steering wheel, the rim can be warmed. As a result, the driver of the vehicle equipped with the steering wheel can comfortably grip the rim even when the inside of the vehicle is cold.

In addition, each of the first metal wire and the second metal wire having an electrically insulated surface may be a disturbance noise detection electrode that detects disturbance noise with respect to signals detected in the first electrode layer and the second electrode layer.

This allows the influence of disturbance noise to be suppressed and the measurement value based on the capacitance generated in the first electrode layer and the second electrode layer to be appropriately acquired.

In addition, one of the two first clamping portions clamps a conductive first non-woven fabric between the one of the two first clamping portions and the first electrode layer, and one of the two second clamping portions clamps a conductive second non-woven fabric between the one of the two second clamping portions and the second electrode layer.

With this, since the first non-woven fabric is disposed as a cushioning material between one of the two first clamping portions and the first electrode layer, the occurrence of damage such as cracks in the first electrode layer can be suppressed. In addition, since the first non-woven fabric is electrically conductive, it is possible to transmit the electric signal from the first electrode layer appropriately to the first electric wire such as a cable via the first non-woven fabric. Similarly to the first non-woven fabric, since the second non-woven fabric is disposed as a cushioning material, the occurrence of damage to the second electrode layer can be suppressed and it is possible to transmit the electric signal from the second electrode layer appropriately to the second electric wire.

In addition, an electrode connection structure according to another aspect of the present disclosure includes: a first base material; an electrode layer located on one surface of the first base material; a second base material disposed on a surface opposite to the one surface of the first base material; a metal wire fixed to the second base material; and a fastening member that fastens one end of an electric wire to the first base material and the second base material, wherein the fastening member includes: a shaft portion inserted in a through hole penetrating the electrode layer, the first base material and the second base material; and two clamping portions disposed on the shaft portion so as to clamp a periphery of the through hole in each of the electrode layer, the first base material, and the second base material in an axial direction of the shaft portion, the one end of the electric wire is fixed to the fastening member while being electrically connected to the electrode layer, and the two clamping portions clamp the metal wire fixed to the second base material in the axial direction together with the electrode layer, the first base material, and the second base material.

With this, since the metal wire fixed to the second base material is clamped by the two clamping portions of the fastening member together with the first base material and the like, the mechanical connection strength of the electrode connection structure can be increased, and the electrode connection structure can be made less prone to damage. That is, the metal wire fixed to the second base material is clamped by the two clamping portions of the fastening member fixed to one end (specifically, a cable terminal) of an electric wire such as a cable. Therefore, for example, when a force is applied to the shaft portion of the fastening member fixed to one end of the electric wire by pulling the electric wire (for example, the cable), the metal wire receives the tensile stress. Here, since the metal wire is fixed to the second base material, the second base material is reinforced, and the metal wire can suppress the movement of the shaft portion of the fastening member fixed to one end of the electric wire. As a result, it is possible to suppress the periphery of the through hole in the electrode layer, the first base material, and the second base material from being torn by the shaft portion.

In addition, the electrode connection structure may further include an insulating member disposed between the metal wire and one of the two clamping portions and clamped in the axial direction by the two clamping portions. For example, the insulating member may be a resin sheet. Alternatively, the insulating member may be a metal washer having a surface with an insulating property.

With this, since the insulating member is disposed as a cushioning material between the metal wire and one of the two clamping portions, even if the metal wire is strongly pressed by the clamping portions clamping the metal wire, the occurrence of damage of the metal wire can be suppressed. As a result, even if the metal wire is coated, it is possible to suppress the coating from peeling off.

In addition, the electrode connection structure may further include: a third fastening member that fastens one end of the third electric wire to the first base material and the second base material; and a banding member that bands at least one of the first electric wire or the second electric wire and the third electric wire. For example, the electrode connection structure further includes a metal wire fixed to the second base material, wherein the third fastening member may fasten the third electric wire to the first base material and the second base material by electrically and structurally connecting one end of the third electric wire to one end of the metal wire.

With this, at least one of the first electric wire or the second electric wire and the third electric wire are banded by the banding member. Therefore, even if the third electric wire is pulled, it is possible to suppress the pulling force from being transmitted to the third fastening member, and to transmit the pulling force to the first fastening member and the second fastening member that have high mechanical strength. As a result, it is possible to suppress the second base material from being torn by the third fastening member and the metal wire.

In addition, the electrode connection structure may further include another fastening member for fastening one end of another electric wire different from the electric wire to the first base material and the second base material; and a banding member that bands the electric wire and the other electric wire. For example, the other fastening member may fasten the other electric wire to the first base material and the second base material by electrically and structurally connecting one end of the other electric wire to one end of the metal wire.

With this, the electric wire and the other electric wire are banded by the banding member. Therefore, even if the other electric wire is pulled, it is possible to suppress the pulling force from being transmitted to the other fastening member, and to transmit the pulling force to the fastening member having high mechanical strength. As a result, it is possible to suppress the second base material from being torn by the other fastening member and the metal wire.

In addition, an electrode connection method according to one aspect of the present disclosure includes: disposing a second base material on a surface opposite to one surface of a first base material having the one surface on which a first electrode layer and a second electrode layer are formed; disposing an insulating member on the second base material; fastening one end of the first electric wire to the first base material and the second base material by a first fastening member having a first shaft portion and two first clamping portions disposed on the first shaft portion; and fastening one end of the second electric wire to the first base material and the second base material by a second fastening member having a second shaft portion and two second clamping portions disposed on the second shaft portion, the fastening by the first fastening member including: inserting the first shaft portion in a first through hole that penetrates the first electrode layer, the first base material, the second base material, and the insulating member; clamping a periphery of the first through hole in each of the first electrode layer, the first base material, the second base material, and the insulating member by the two first clamping portions in an axial direction of the first shaft portion; and fixing the one end of the first electric wire to the first fastening member while being electrically connected to the first electrode layer, the fastening by the second fastening member including: inserting the second shaft portion in a second through hole that penetrates the second electrode layer, the first base material, the second base material, and the insulating member; clamping a periphery of the second through hole in each of the second electrode layer, the first base material, the second base material, and the insulating member by the two second clamping portions in an axial direction of the second shaft portion; and fixing the one end of the first electric wire to the first fastening member while being electrically connected to the first electrode layer.

In addition, an electrode connecting method according to another aspect of the present disclosure includes: disposing a second base material on a surface opposite to one surface of a first base material having the one surface on which an electrode layer is formed; fixing a metal wire to the second base material; fastening one end of an electric wire to the first base material and the second base material by a fastening member having a shaft portion and two clamping portions disposed on the shaft portion, the fastening by the fastening member includes: inserting the shaft portion in a through hole penetrating the electrode layer, the first base material, and the second base material; clamping a periphery of the through hole in each of the electrode layer, the first base material, and the second base material by the two clamping portions in an axial direction of the shaft portion; and fixing the one end of the electric wire to the fastening member while being electrically connected to the electrode layer, wherein the two clamping portions clamp the metal wire fixed to the second base material in the axial direction together with the electrode layer, the first base material, and the second base material.

With this, the same working effect as the electrode connection structure described above can be obtained.

Hereinafter, embodiments will be specifically described with reference to the drawings.

It should be noted that each of the embodiments described below shows a comprehensive or specific example. Numerical values, shapes, materials, components, arrangement positions and connection forms of components elements, steps, order of steps, and the like shown in the following embodiments are examples, and are not intended to limit the present disclosure. In addition, among the components in the following embodiments, components not described in the independent claim showing the highest concept are described as arbitrary components.

In addition, each drawing is a schematic view, and is not necessarily strictly illustrated. In addition, in each drawing, the same reference numerals are given to the same component members. In addition, in the following embodiments, expressions such as a substantially T-shape are used. For example, substantially the same means not only being exactly the same, but also being substantially the same, that is, including an error of, for example, about several percent. In addition, substantially the same means being the same within a range in which the effect according to the present disclosure can be obtained. The same applies to other expressions using "substantially".

Embodiment 1

FIG. 1 is a diagram showing an example of a vehicle interior of a vehicle in which a grip sensor having an electrode connection structure according to the present embodiment is disposed.

Vehicle 1 includes steering wheel 200, speaker 301, and display device 302 such as a liquid crystal display. Speaker 301 and display device 302 are configured as an alerting device, for example.

Steering wheel 200 is for steering vehicle 1. Steering wheel 200 includes ring-shaped rim 210, substantially T-shaped spoke 202 integrally formed on the inner peripheral surface of rim 210, and horn switch cover 203 covering a horn switch (not shown) disposed in the center of spoke 202.

Grip sensor 100 is a device that detects a grip of steering wheel 200 by a hand, and is provided in steering wheel 200 of vehicle 1 as shown in FIG. 1. Specifically, grip sensor 100 includes sensor 110 embedded in rim 210 of steering wheel 200, control circuit 120 that detects a grip based on a signal from sensor 110, and harness 130 that electrically connects sensor 110 to control circuit 120. Control circuit 120 is embedded in spoke 202, for example. Such grip sensor 100 detects a grip of rim 210 of steering wheel 200.

A part or all of sensor 110 in the present embodiment is configured as an electrode connection structure. In addition, sensor 110 includes at least one electrode. At this electrode, the capacitance changes depending on whether the driver of vehicle 1 is gripping rim 210 of steering wheel 200 or not. Control circuit 120 measures a value corresponding to the capacitance of the electrode, and detects the grip of rim 210 by the driver's hand based on the value. Then, when vehicle 1 is driven but the grip is not detected, control circuit 120 causes the alerting device to alert the driver. For example, speaker 301 of the alerting device alerts the driver with a warning sound or a voice. Display device 302 displays a warning message prompting the driver to firmly hold steering wheel 200. This can reduce traffic accidents.

Figure 2:
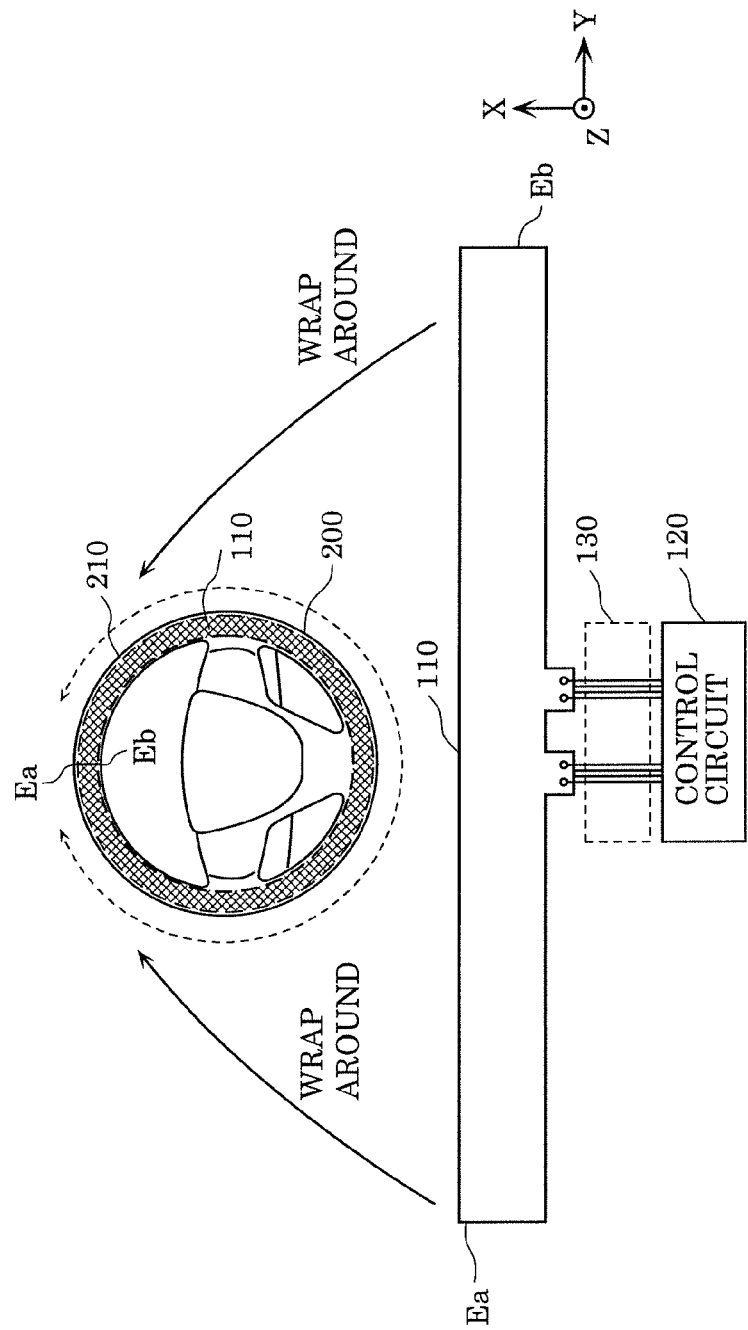
FIG. 2 is a diagram showing an example of how to wrap a sensor around a rim in Embodiment 1.

FIG. 2 is a diagram showing an example of how to wrap sensor 110 around rim 210 in the present embodiment.

Sensor 110 is a sheet-shaped structure having elasticity, flexibility, and ductility as a whole, and is formed in a long shape.

It should be noted that in the present embodiment, the longitudinal direction of sensor 110 is referred to as the Y-axis direction, and the direction perpendicular to the Y-axis direction on the plane parallel to sensor 110 is referred to as the X-axis direction. In addition, one end side (left end side in FIG. 2) of sensor 110 in the Y-axis direction is referred to as a negative side, and the other end side (right end side in FIG. 2) is referred to as a positive side. Similarly, one end side (lower end side in FIG. 2) of sensor 110 in the X-axis direction is referred to as a negative side, and the other end side (upper end side in FIG. 2) is referred to as a positive side. Furthermore, the direction perpendicular to the plane of sensor 110 is referred to as the Z-axis direction. In addition, one side in the Z-axis direction (back side of the plane of FIG. 2) is referred to as a negative side, and the other side in the Z-axis direction (front side of the plane of FIG. 2) is referred to as a positive side.

Sensor 110 is attached to rim 210 of steering wheel 200. At this time, sensor 110 is wrapped around rim 210 so that sensor 110 forms a ring. Then, both ends Ea and Eb of sensor 110 are disposed so as to substantially face each other.

Here, when sensor 110 is wrapped around rim 210 of steering wheel 200, sensor 110 is wrapped around while being stretched. Therefore, as described above, sensor 110 has elasticity, flexibility, and ductility, and is stretched by, for example, about 15%.

Figure 3A:
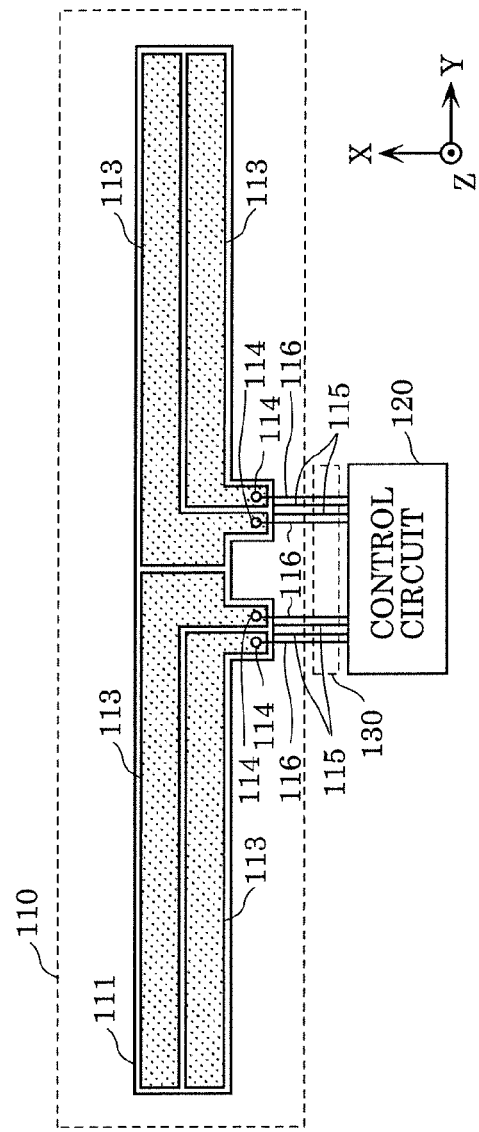
FIG. 3A is a front view of the grip sensor according to Embodiment 1.
Figure 3B:
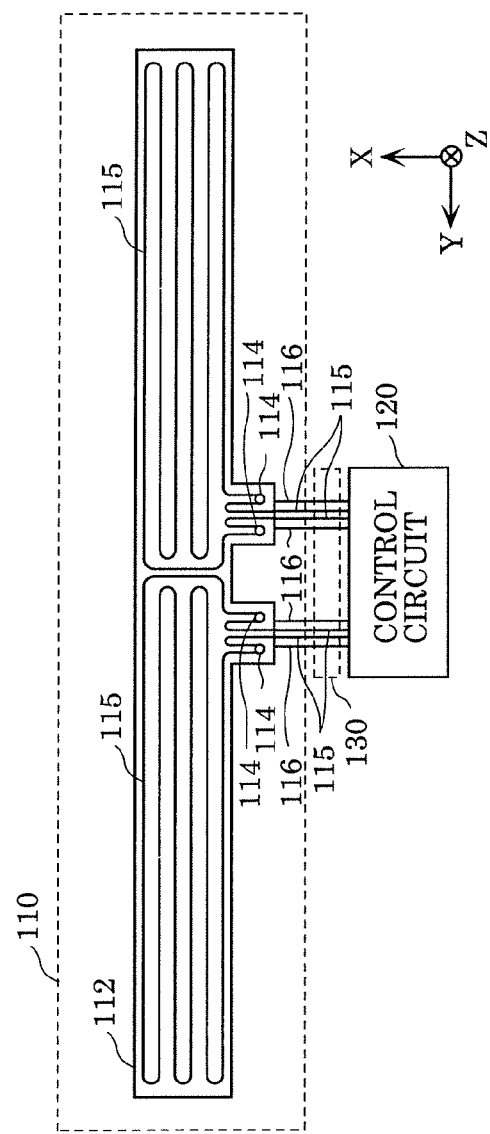
FIG. 3B is a rear view of the grip sensor according to Embodiment 1.

FIG. 3A is a front view of grip sensor 100 according to the present embodiment. FIG. 3B is a rear view of grip sensor 100 according to the present embodiment.

Grip sensor 100 includes sensor 110, control circuit 120, and harness 130 as described above.

For example, as shown in FIGS. 3A and 3B, sensor 110 includes first base material 111, second base material 112, four electrode layers 113, four fastening members 114, and two metal wires 115.

First base material 111 is formed by a material having elasticity, flexibility, and ductility in a long sheet shape. For example, first base material 111 comprises synthetic resin such as polyethylene terephthalate (PET).

Each of four electrode layers 113 is formed on one surface, for example, the front surface of first base material 111, as shown in FIG. 3A. It should be noted that the front surface is, for example, a surface on the positive side in the Z-axis direction of first base material 111. These electrode layers 113 are formed on the front surface of first base material 111 by nickel plating, for example.

It should be noted that although sensor 110 has four electrode layers 113 in the present embodiment, the number of electrode layers 113 may be one, two, or three, or may be four or more. In addition, electrode layer 113 may have any form as long as it functions as an electrode. That is, electrode layer 113 may be a solid electrode, a sheet-shaped or plate-shaped electrode, a wiring pattern, or the like. In other words, the shape, number, array pattern and the like of electrode layers 113 shown in FIGS. 3A and 3B are examples, and may have any shape, number, and array pattern.

In addition, first base material 111 may be separated into four portions. In this case, electrode layer 113 is formed on each of the four portions. Furthermore, electrode layer 113 may be formed not only on the respective surfaces of the four separated portions but also on the entire surface. In addition, when each of the four portions of first base material 111 is formed as a PET woven fabric, electrode layer 113 may be formed over the entire fibers of the woven fabric. In this case, first base material 111 on which electrode layer 113 is formed is configured as a conductive cloth.

As shown in FIG. 3B, second base material 112 is disposed on the surface opposite to the one surface of first base material 111, that is, on the rear surface. Similar to first base material 111, this second base material 112 is configured as a long mat made of a material (for example, polyethylene) having elasticity, flexibility, and ductility. First base material 111 and second base material 112 are, for example, stacked so that their peripheral edges coincide with each other when viewed from the front surface or the rear surface, and joined to each other by a tape having an adhesive layer such as a double-sided tape or the like, or an adhesive bond or an adhesive agent. It should be noted that a structure using a double-sided tape will be described in the following description.

Each of four fastening members 114 has a member for fastening one end (for example, a cable terminal) of cable 116, which is an electric wire for electrically connecting to electrode layer 113 corresponding to fastening member 114, to first base material 111 and second base material 112. These fastening members 114 are, for example, rivets. It should be noted that fastening member 114 is not limited to a rivet, and may be a member including a bolt and a nut or may be another member as long as it can fasten first base material 111 and second base material 112 together. In addition, electrode layer 113 is electrically connected to control circuit 120 by fastening member 114 via cable 116. It should be noted that as shown in FIGS. 3A and 3B, harness 130 is formed by banding a plurality of (here, four) cables 116 and metal wires 115.

Each of two metal wires 115 is fixed to the surface of second base material 112 opposite to first base material 111. For example, metal wires 115 are sewn to second base material 112 so that a zigzag pattern is formed. Metal wire 115 is, for example, a resin-coated conductive wire and is used as a heater element. That is, the surface of metal wire 115 is electrically insulated, and both ends of metal wire 115 are electrically connected to control circuit 120. When control circuit 120 causes an electric current to flow through metal wire 115, metal wire 115 generates heat. Due to this heat generation, metal wire 115 warms sensor 110. As a result, rim 210 of steering wheel 200 can be warmed. Therefore, the driver of vehicle 1 can comfortably grip rim 210 even if the inside of the vehicle is cold.

The electrode connection structure in the present embodiment may be entire sensor 110 or a part of sensor 110. The part of sensor 110 is, for example, a structure including fastening member 114 in sensor 110 and a periphery where fastening member 114 is disposed.

Figure 4:
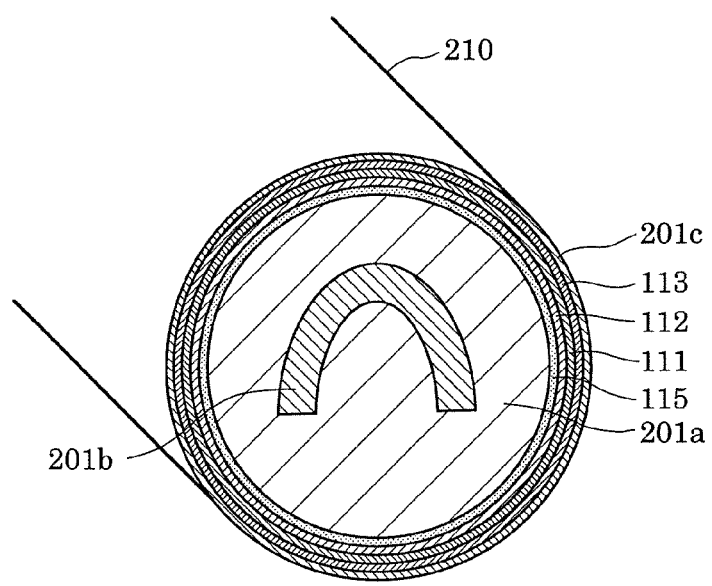
FIG. 4 is a diagram showing an example of a cross section of the rim to which the sensor according to Embodiment 1 is attached.

FIG. 4 is a diagram showing an example of a cross section of rim 210 to which sensor 110 is attached.

Rim 210 includes cored bar 201b, which is a metal annular core, and resin layer 201a comprising urethane resin or the like, which covers cored bar 201b.

Sensor 110 shown in FIGS. 3A and 3B is wrapped around resin layer 201a so that second base material 112 faces resin layer 201a. As a result, each component of sensor 110 is arranged in the order of metal wire 115, second base material 112, first base material 111, and electrode layer 113 from the resin layer 201a side toward the outside. It should be noted that the surface of sensor 110 wrapped around in this manner on the electrode layer 113 side is covered with surface layer 201c comprising leather, wood, resin, or the like.

Electrode layer 113 disposed on rim 210 forms a capacitance between electrode layer 113 and cored bar 201b. Here, when the part of rim 210 where electrode layer 113 is disposed is gripped by the driver's hand, capacitance is also formed between electrode layer 113 and the hand. Therefore, control circuit 120 can detect the grip of rim 210 by the hand from the signal output from electrode layer 113 according to the capacitance.

Figure 5:
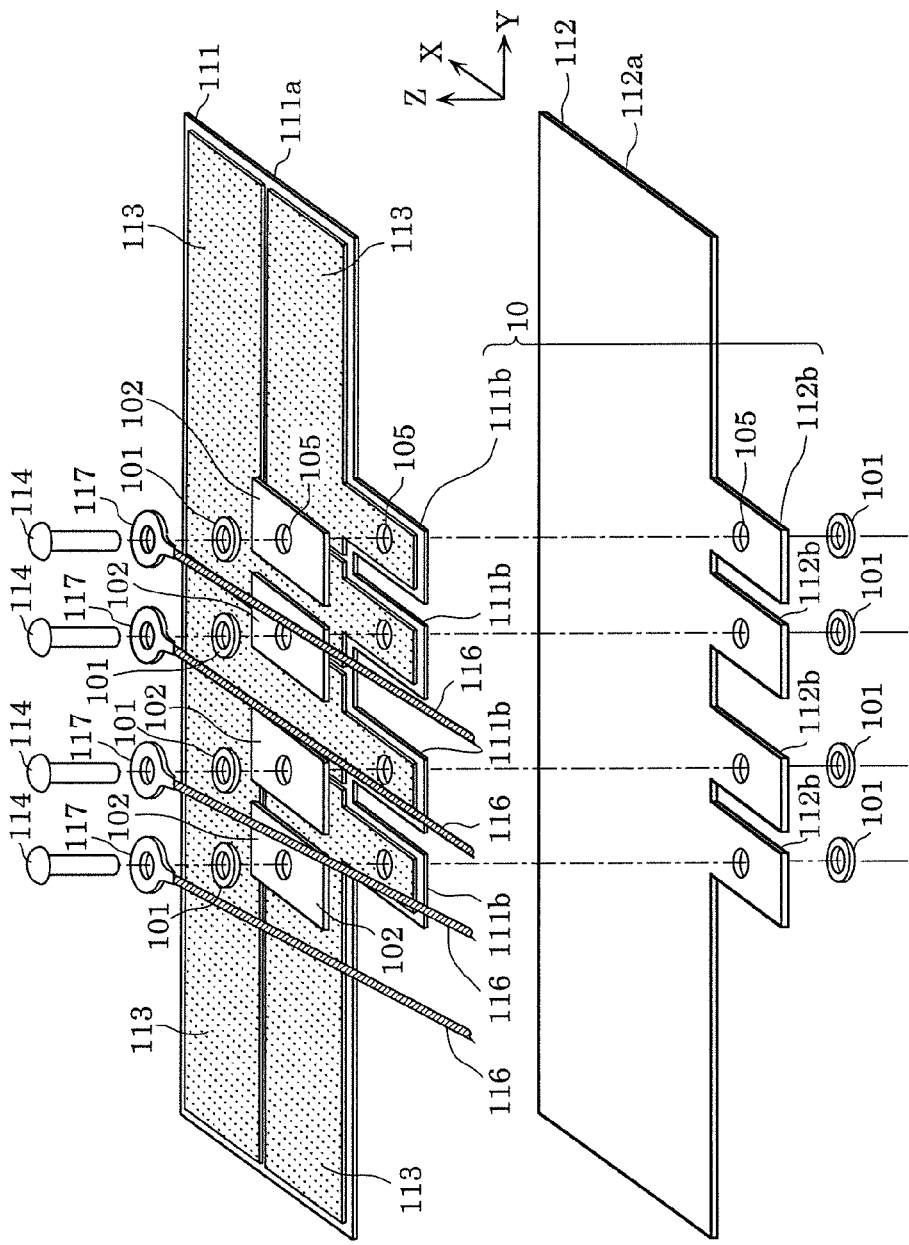
FIG. 5 is an exploded perspective view of the electrode connection structure according to Embodiment 1.

FIG. 5 is an exploded perspective view of sensor 110.

First base material 111 on which four electrode layers 113 are formed includes long first main base material 111a and four first convex portions 111b protruding from first main base material 111a. Specifically, each of four first convex portions 111b is arranged along the Y-axis direction at substantially the center of the side of first main base material 111a on the negative side in the X-axis direction, and protrudes on the negative side in the X-axis direction.

Each of four electrode layers 113 is formed in a range including a part of first main base material 111a and at least a part of first convex portion 111b corresponding to electrode layer 113. Furthermore, through hole 105 is formed in a portion where electrode layer 113 is formed in each of four first convex portions 111b.

Second base material 112 includes second main base material 112a facing first main base material 111a and four second convex portions 112b protruding from second main base material 112a and facing four respective first convex portions 111b. Specifically, similar to four first convex portions 111b, each of four second convex portions 112b is arranged substantially in the center of the side of second main base 112a on the negative side in the X-axis direction along the Y-axis direction, and protrudes on the negative side in the X-axis direction. Furthermore, through hole 105 is formed in each of four second convex portions 112b.

First base material 111 and second base material 112 are stacked via a double-sided tape with through holes 105 formed in the respective base materials disposed to communicate with each other. At this time, the rear surface of first base material 111, that is, the surface on which electrode layer 113 is not formed, and the rear surface of second base material 112, that is, the surface on which metal wire 115 is not sewn, are joined by a double-sided tape. With this, first base material 111 and second base material 112 are bonded together. It should be noted that through hole 105 may be formed by drilling first base material 111 and second base material 112 after they are stacked via the double-sided tape.

Here, a set of first convex portion 111b of first base material 111 on which electrode layer 113 is formed and second convex portion 112b of second base material 112 that is joined to face first convex portion 111b will be referred to as electrode lead-out portion 10 below. That is, sensor 110 has four electrode lead-out portions 10.

In the present embodiment, in order to electrically connect electrode layer 113 of electrode lead-out portion 10 to control circuit 120 for each of four electrode lead-out portions 10, cable 116 that is an electric wire and cable terminal 117 connected to one end of cable 116 are used. Cable 116 is, for example, an insulation-coated copper wire. Cable terminal 117 is a ring-shaped (or round-shaped) crimp terminal. This cable terminal 117 is fastened to first base material 111 and second base material 112 by fastening member 114. An electrically conductive non-woven fabric 102 and a pair of washers 101 are used for this fastening.

Electrically conductive non-woven fabric 102 is a non-woven fabric with electrical conductivity. For example, electrically conductive non-woven fabric 102 has elasticity, flexibility and ductility, and is formed by nickel-plating a synthetic resin non-woven fabric. In addition, through hole 105 is also formed in this electrically conductive non-woven fabric 102.

Such electrically conductive non-woven fabric 102 is disposed for each of four electrode lead-out portions 10. That is, electrically conductive non-woven fabric 102 is disposed so as to stack electrode layer 113 of electrode lead-out portion 10 such that respective through holes 105 of electrically conductive non-woven fabric 102 and electrode lead-out portion 10 communicate with each other.

Then, the pair of washers 101 is disposed so as to clamp electrode lead-out portion 10 and electrically conductive non-woven fabric 102 in the Z-axis direction with respect to each of four electrode lead-out portions 10. It should be noted that washer 101 is made of metal and is formed by plating nickel on copper.

Furthermore, cable terminal 117 is disposed for each of four electrode lead-out portions 10. That is, cable terminal 117 is disposed on the positive side in the Z-axis direction of washer 101 so that electrically conductive non-woven fabric 102 and washer 101 are clamped between cable terminal 117 and electrode layer 113 of electrode lead-out portion 10. At this time, cable terminal 117 is disposed so that the hole of the ring of cable terminal 117, the hole of the pair of washers 101, and respective through holes 105 of electrically conductive non-woven fabric 102 and the electrode lead-out portion 10 communicate with each other.

Then, fastening member 114 is disposed for each of four electrode lead-out portions 10. That is, the shaft of fastening member 114 (shaft portion 114c described later) is inserted in through hole 105 penetrating electrode layer 113, first convex portion 111b, and second convex portion 112b. More specifically, fastening member 114 is inserted in the hole of the ring of cable terminal 117, the hole of the pair of washers 101, and respective through holes 105 of electrically conductive non-woven fabric 102 and electrode lead-out portion 10 from the positive side to the negative side in the Z-axis direction. Furthermore, the tip of the inserted fastening member 114 is crimped while protruding from washer 101 on the negative side in the Z-axis direction. That is, the crimping causes the tip of fastening member 114 to be plastically deformed and crushed.

With this, in each of four electrode lead-out portions 10, cable terminal 117, which is one end of the electric wire, is fixed to fastening member 114 while being electrically connected to electrode layer 113 of electrode lead-out portion 10 via electrically conductive non-woven fabric 102 and washer 101. The electrode connecting structure in the present embodiment includes such electrode lead-out portion 10, fastening member 114 corresponding to electrode lead-out portion 10, electrically conductive non-woven fabric 102, cable terminal 117, a pair of washers 101, and metal wire 115.

Figure 6:
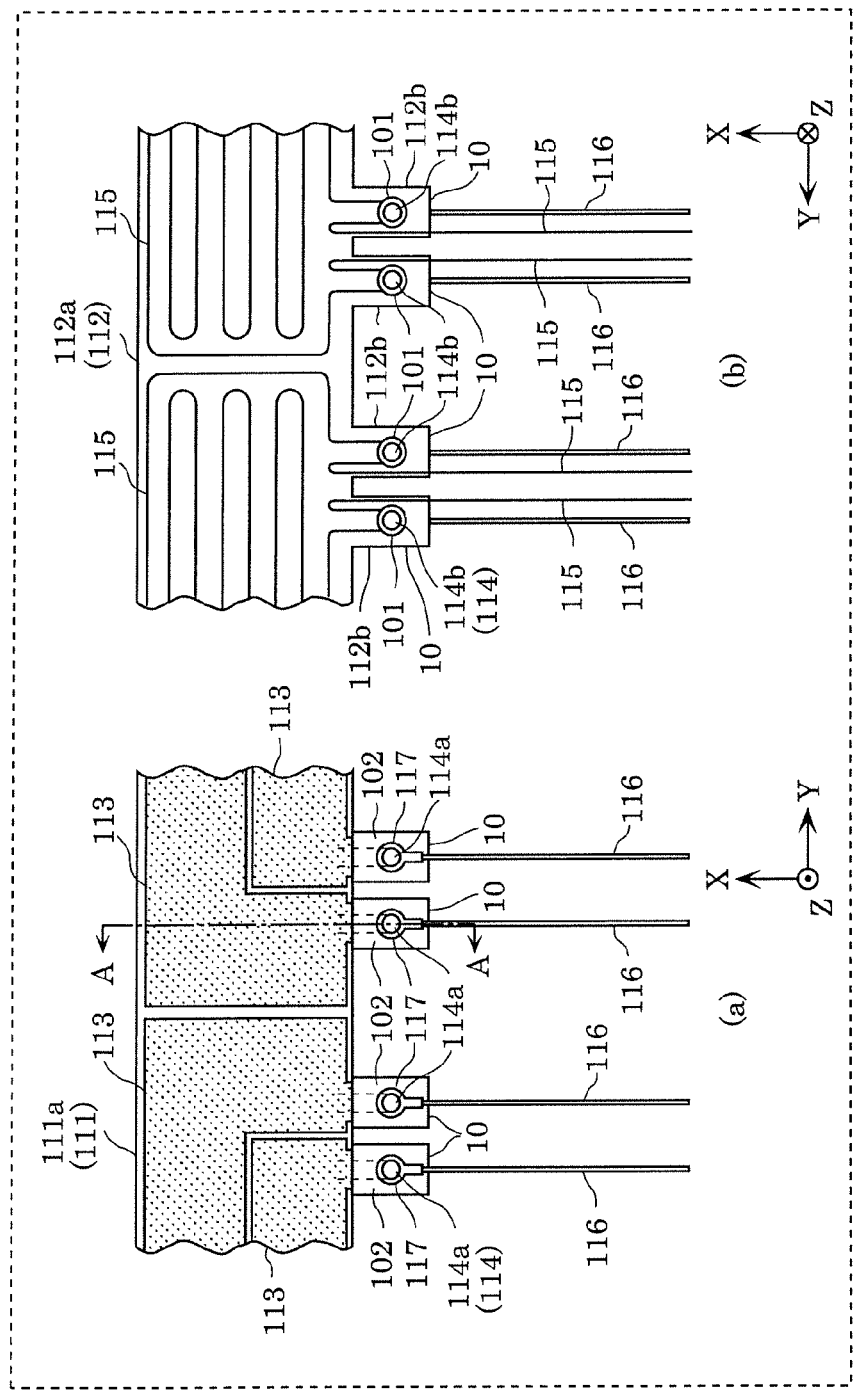
FIG. 6 is a diagram showing a central portion of the sensor according to Embodiment 1.
Figure 7:
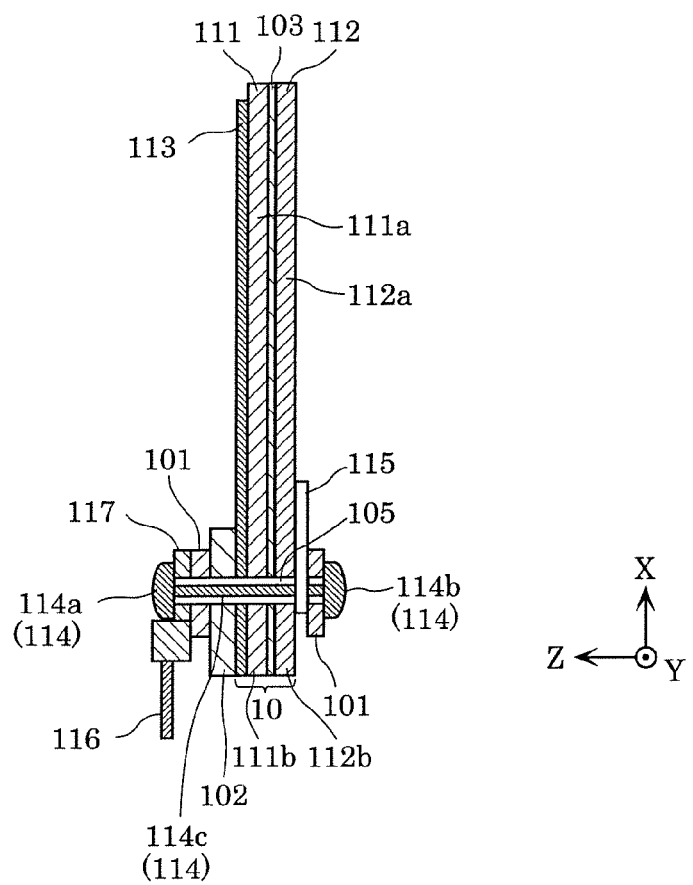
FIG. 7 is a cross-sectional view showing a cross section of the sensor taken along the line A-A of FIG. 6.

FIG. 6 is a diagram showing a central portion of sensor 110. Specifically, (a) in FIG. 6 shows a front-side center portion of sensor 110, and (b) in FIG. 6 shows a back-side center portion of sensor 110. FIG. 7 is a cross-sectional view showing a cross section taken along line A-A of sensor 110 shown in (a) in FIG. 6.

As shown in FIG. 7, fastening member 114 includes shaft portion 114c and two clamping portions 114a and 114b disposed on shaft portion 114c. Shaft portion 114c is inserted in through hole 105 of electrode lead-out portion 10, that is, through hole 105 penetrating electrode layer 113, first base material 111, and second base material 112. Two clamping portions 114a and 114b are disposed on shaft portion 114c so as to clamp the periphery of through hole 105 in each of electrode layer 113, first base material 111, and second base material 112 in the axial direction of shaft portion 114c. It should be noted that when fastening member 114 is a rivet, clamping portion 114a is a head portion of the rivet, shaft portion 114c is a body portion of the rivet, and clamping portion 114b is a portion formed like a head portion by crimping the tip of the body portion. In addition, as shown in FIG. 7, first base material 111 and second base material 112 are joined by double-sided tape 103.

Here, in electrode lead-out portion 10 in the present embodiment, clamping portions 114a and 114b of fastening member 114 clamp metal wire 115 fixed to second base material 112 in the Z-axis direction together with electrode layer 113, first base material 111, and second base material 112, as shown in FIGS. 6 and 7. That is, clamping portions 114a and 114b clamp metal wire 115 sewn on second base material 112 together with electrode layer 113, first base material 111, and the like. In other words, fastening member 114 fastens metal wire 115 together with electrode layer 113, first base material 111, and the like.

With this, in the present embodiment, the mechanical connection strength of the electrode connection structure including electrode lead-out portion 10 can be increased. For example, when a force is applied to shaft portion 114c of fastening member 114 fixed to cable terminal 117 by pulling cable 116 connected to cable terminal 117, metal wire 115 receives the tensile stress. Therefore, since metal wire 115 is firmly fixed to entire second base material 112 as shown in FIG. 3B, second base material 112 is reinforced and the movement of shaft portion 114c of fastening member 114 fixed to cable terminal 117 can be suppressed by metal wire 115. As a result, the periphery of through hole 105 in electrode layer 113, first base material 111, and second base material 112 can be suppressed from being torn by shaft portion 114c.

In addition, the part of metal wire 115 clamped by clamping portions 114a and 114b is on second convex portion 112b as shown in (b) in FIG. 6. The other part of metal wire 115 is fixed to second main base material 112a as shown in (b) in FIG. 6.

Therefore, since metal wire 115 is fixed to second main base material 112a, even if cable 116 connected to cable terminal 117 is pulled, it is possible to suppress first convex portion 111b and second convex portion 112b from being torn from first main base material 111a and second main base material 112a.

Figure 8:
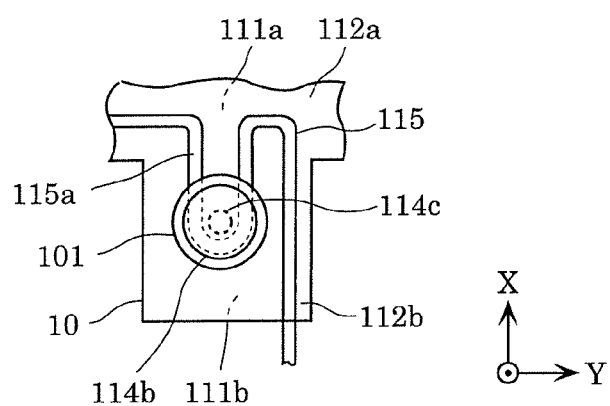
FIG. 8 is a diagram showing an example of a part where a metal wire is clamped in Embodiment 1.

FIG. 8 is a diagram showing an example of a part where metal wire 115 is clamped. Specifically, FIG. 8 is an enlarged view of a part of metal wire 115 around clamping portion 114b of fastening member 114 shown in (b) in FIG. 6.

As shown in FIG. 8, metal wire 115 in the present embodiment includes substantially U-shaped folded-back portion 115a. Both ends of folded-back portion 115a are fixed to second main base material 112a. In addition, the central portion of folded-back portion 115a is fixed to second convex portion 112b. Then, shaft portion 114c of fastening member 114 is disposed inward of folded-back portion 115a. In addition, the central portion of folded-back portion 115a is included in clamping portion 114b of fastening member 114.

With this, even if a strong force to the outside (for example, the negative side in the X-axis direction) is applied to shaft portion 114c by pulling cable 116, the electrode connection structure can sufficiently withstand the force due to substantially U-shaped folded-back portion 115a of metal wire 115. As a result, the mechanical connection strength of the electrode connection structure can be further increased.

Figure 9:
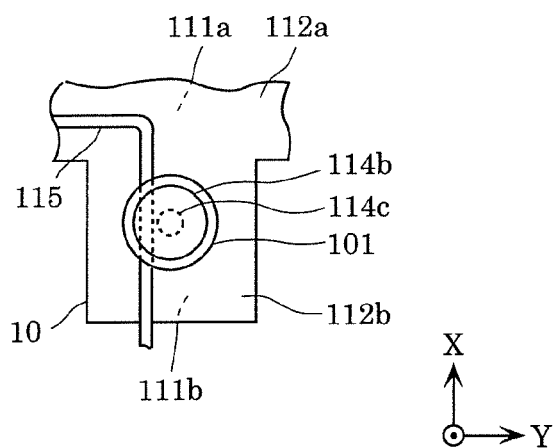
FIG. 9 is a diagram showing another example of the part where the metal wire is clamped in Embodiment 1.

FIG. 9 is a diagram showing another example of a part where metal wire 115 is clamped.

As shown in FIG. 8, metal wire 115 in the present embodiment includes substantially U-shaped folded-back portion 115a, but it may not include such folded-back portion 115a. For example, the part where metal wire 115 is clamped may be formed in a substantially I-shape as shown in FIG. 9. Since even with such a shape, metal wire 115 reinforces second convex portion 112b and metal wire 115 is clamped by clamping portions 114a and 114b, the mechanical connection strength of the electrode connection structure can be increased.

Figure 10:
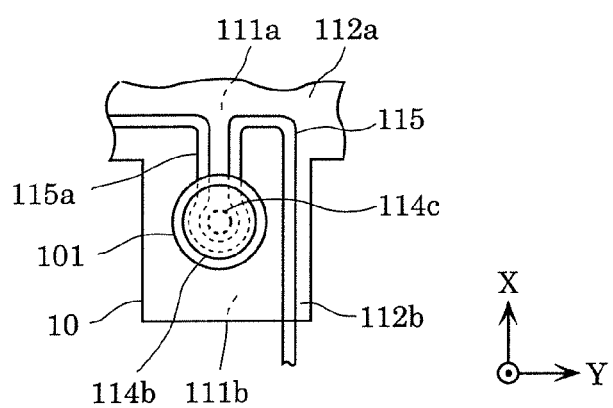
FIG. 10 is a diagram showing another example of the part where the metal wire is clamped in Embodiment 1.

FIG. 10 is a diagram showing another example of a part where metal wire 115 is clamped.

Metal wire 115 in the present embodiment includes substantially U-shaped folded-back portion 115a as shown in FIG. 8, but substantially U-shaped may be a shape having a narrowed upper portion as shown in FIG. 10, for example. That is, substantially U-shaped folded-back portion 115a is defined to include the shape of FIG. 10. Even with such a shape, the electrode connection structure can sufficiently withstand the force due to substantially U-shaped folded-back portion 115a of metal wire 115. As a result, the mechanical connection strength of the electrode connection structure can be further increased.

As described above, in the electrode connection structure according to the present embodiment, metal wire 115 fixed to second base material 112 is clamped together with first base material 111 and the like by two clamping portions 114a and 114b of fastening member 114. Therefore, the mechanical connection strength of the electrode connection structure can be increased. As a result, the electrode connection structure can be made less prone to damage.

That is, by fixing metal wire 115 to second base material 112, it is possible to increase the proof stress against local tensile stress in electrode lead-out portion 10 and the periphery of electrode lead-out portion 10. Therefore, even when a load of tension is applied to cable 116, it is possible to increase the mechanical connection strength in electrode lead-out portion 10 and the periphery of electrode lead-out portion 10. In addition, since a general member such as a rivet can be used as fastening member 114 in the present embodiment, cable terminal 117, electrode layer 113, first base material 111, and second base material 112 can be easily clamped.

In addition, in the electrode connection structure of PTL 1 described above, the antenna electrode needs to be protruded from the end of the base member in order to form the stacked portion. Therefore, it is necessary to separately prepare the antenna electrode and the base member and bond them.

However, since it is not necessary in the present embodiment to protrude electrode layer 113 from the ends of first base material 111 and second base material 112 when sensor 110 is viewed from the front or the rear surface, for example, a plurality of sensors 110 can be efficiently generated. Specifically, by forming a required number of electrode layers 113 for the plurality of sensors 110 on a base material for cutting out the plurality of first base materials 111, and cutting out the plurality of first base materials 111 from the base material, the plurality of sensors 110 can be efficiently generated. In addition, by sewing a required number of metal wires 115 for the plurality of sensors 110 on a base material for cutting out the plurality of second base materials 112, first base material 111 on which electrode layer 113 is formed may be joined to each of portions corresponding to their metal wires 115. Then, by cutting out the plurality of second base materials from the base material, the plurality of sensors 110 can be efficiently generated.

Here, in the present embodiment, the surface of washer 101, which is disposed on the side of clamping portion 114b of fastening member 114, of a pair of washers 101 may be covered with an insulating material. With this, even if washer 101 strongly abuts metal wire 115 and the insulating coating of metal wire 115 tears, it is possible to suppress the electrical continuity of metal wire 115 and electrode layer 113 via washer 101 and fastening member 114.

Embodiment 2

The electrode connection structure according to the present embodiment further includes an insulating member in addition to the features included in the electrode connection structure according to Embodiment 1. Hereinafter, points of the electrode connection structure according to the present embodiment different from those of Embodiment 1 will be described, and detailed description of the same features as those of Embodiment 1 will be omitted.

Figure 11:
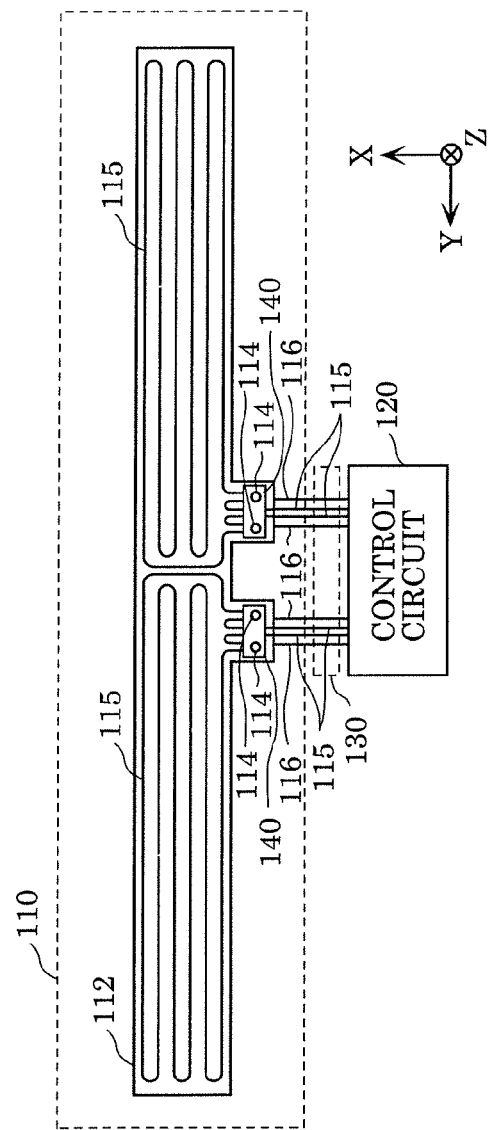
FIG. 11 is a rear view of the grip sensor according to Embodiment 2.

FIG. 11 is a rear view of grip sensor 100 according to the present embodiment.

As shown in FIG. 11, grip sensor 100 includes sensor 110, control circuit 120, and harness 130, as in Embodiment 1. Here, in the present embodiment, sensor 110 includes two insulating members 140.

Each of two insulating members 140 is disposed on the surface of second base material 112 so as to cover a part of metal wire 115 around two fastening members 114. It should be noted that the front surface of second base material 112 is a surface of second base material 112 opposite to the first base material 111 side.

Such insulating member 140 is a member having electrical insulation and is, for example, a resin sheet, a rubber sheet, a non-woven fabric, or a metal sheet having an insulating surface.

Figure 12:
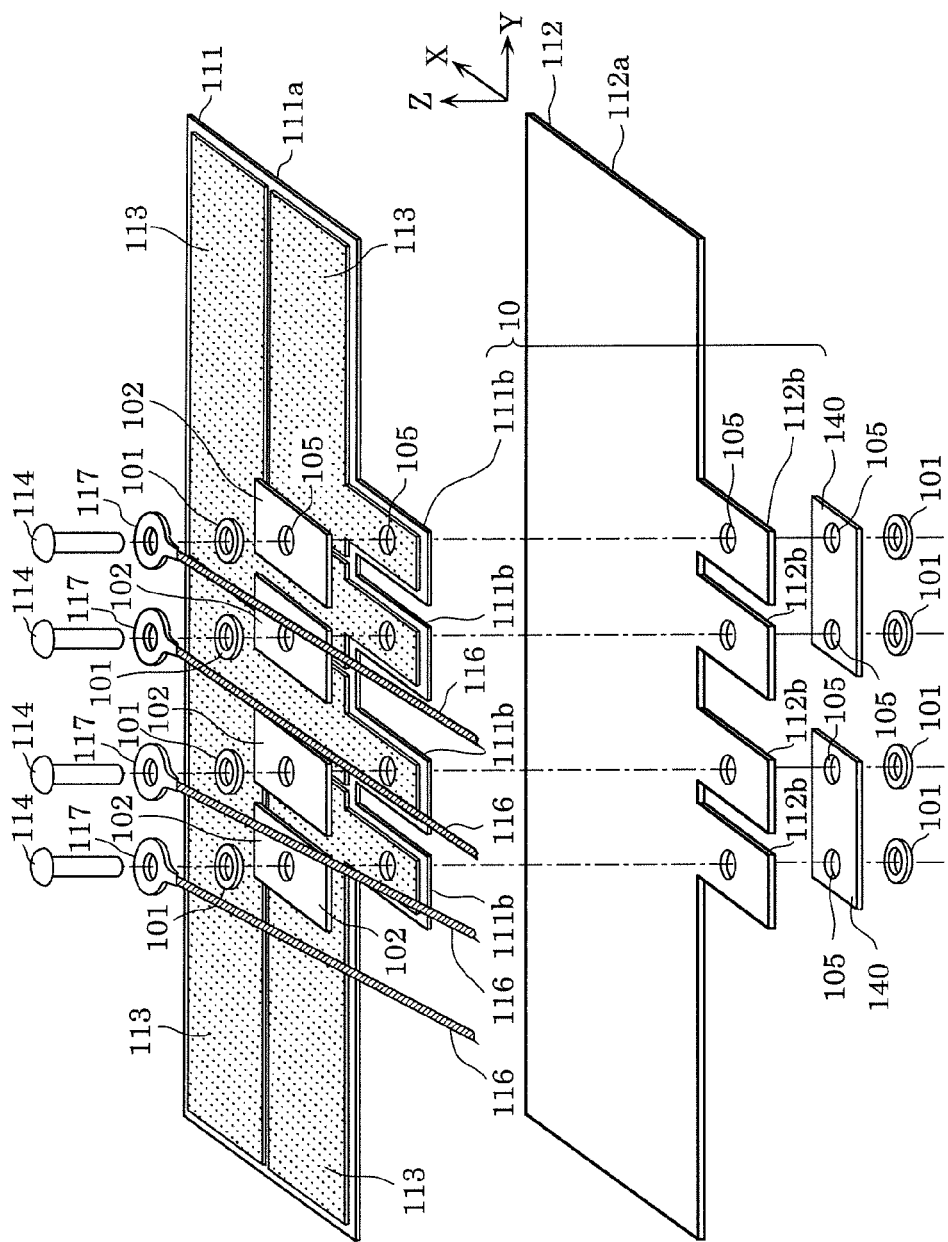
FIG. 12 is an exploded perspective view of the electrode connection structure according to Embodiment 2.

FIG. 12 is an exploded perspective view of sensor 110 in the present embodiment.

Each of the two insulating members 140 is disposed so as to cover the front surface (that is, the surface on the negative side in the Z-axis direction) of two second convex portions 112b of second base material 112. At this time, insulating member 140 is disposed so that the two through holes 105 formed in insulating member 140 communicate with through holes 105 of the two second convex portions 112b adjacent to each other. Then, insulating member 140 is clamped together with two electrode lead-out portions 10 by two fastening members 114.

Specifically, when insulating member 140 is clamped, a pair of washers 101 corresponding to electrode lead-out portion 10 is disposed in each of two electrode lead-out portions 10 so as to clamp electrically conductive non-woven fabric 102, electrode lead-out portion 10, and insulating member 140 in the Z-axis direction. Furthermore, cable terminal 117 and fastening member 114 are disposed for each of two electrode lead-out portions 10. At this time, the shaft of fastening member 114 used for one of two electrode lead-out portions 10 is inserted in through hole 105 penetrating electrode layer 113, first convex portion 111b, second convex portion 112b, and insulating member 140. Furthermore, the shaft of fastening member 114 used for the other of two electrode lead-out portions 10 is inserted in another through hole 105 that penetrates another electrode layer 113, first convex portion 111b, second convex portion 112b, and insulating member 140.

More specifically, the shaft of fastening member 114 is inserted in a hole of the ring of cable terminal 117, a hole of the pair of washers 101, and through hole 105 in each of electrically conductive non-woven fabric 102, electrode lead-out portion 10, and insulating member 140 from the positive side to the negative side in the Z-axis direction. Furthermore, the tip of the inserted fastening member 114 is crimped while protruding from washer 101 on the negative side in the Z-axis direction.

With this, in each of four electrode lead-out portions 10, cable terminal 117, which is one end of the electric wire, is fixed to fastening member 114 while being electrically connected to electrode layer 113 of electrode lead-out portion 10 via electrically conductive non-woven fabric 102 and washer 101. The electrode connecting structure in the present embodiment includes such electrode lead-out portion 10, fastening member 114 corresponding to electrode lead-out portion 10, electrically conductive non-woven fabric 102, cable terminal 117, a pair of washers 101, insulating member 140, and metal wire 115.

Figure 13:
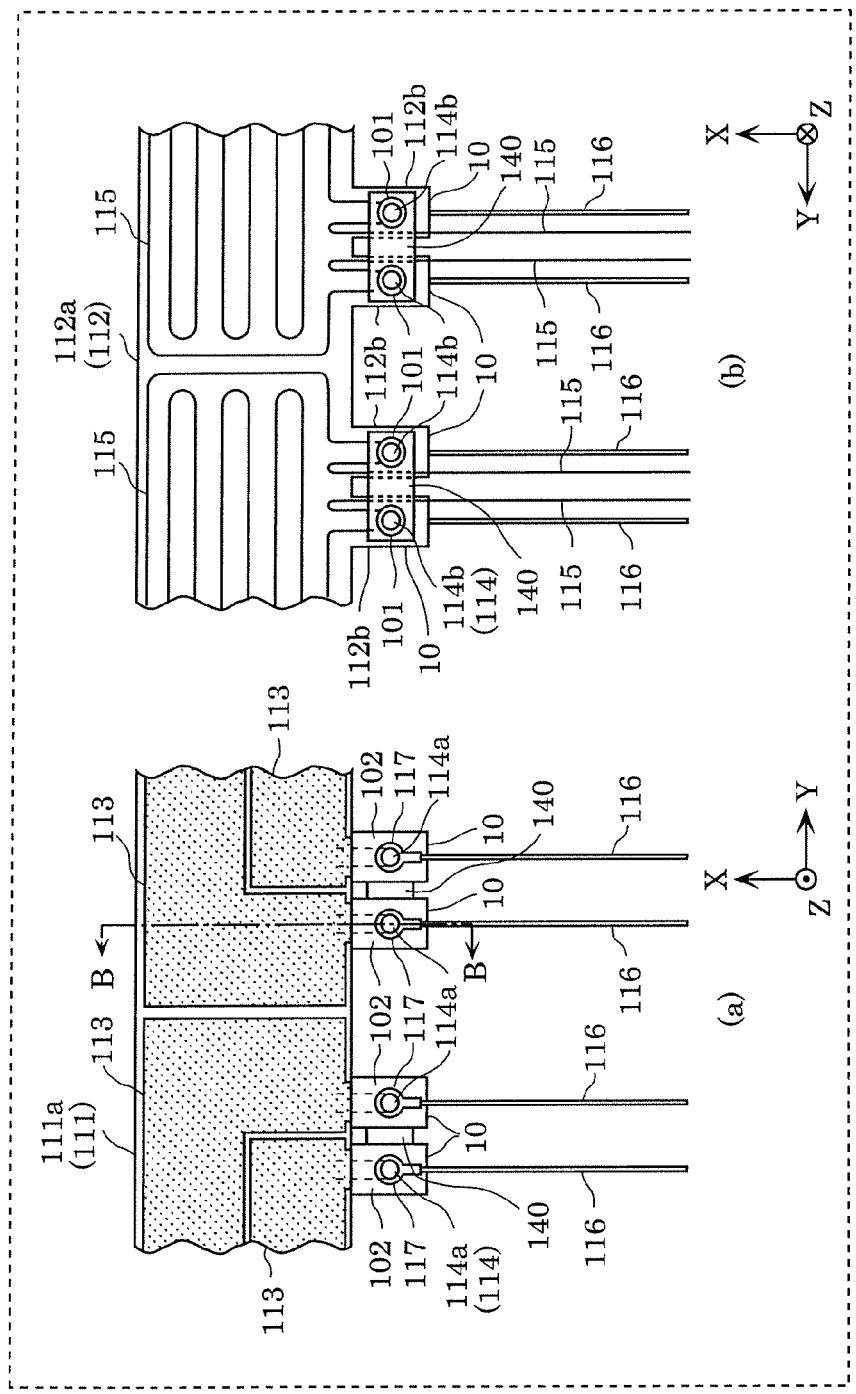
FIG. 13 is a diagram showing a central portion of the sensor according to Embodiment 2.
Figure 14:
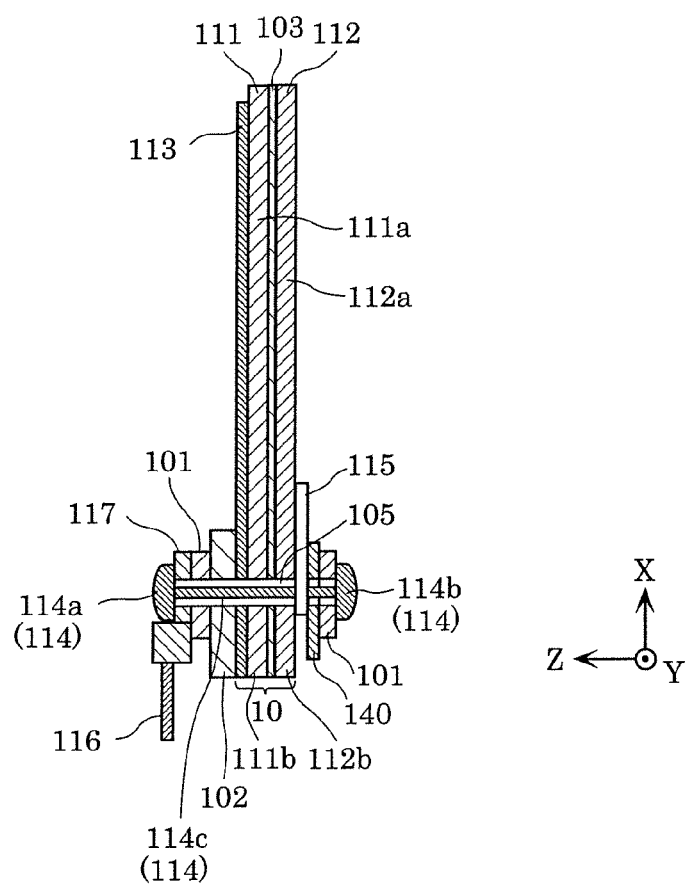
FIG. 14 is a cross-sectional view showing a cross section of the sensor taken along the line B-B in FIG. 13.

FIG. 13 is a diagram showing a central portion of sensor 110 in the present embodiment. Specifically, (a) in FIG. 13 shows a front center portion of sensor 110, and (b) in FIG. 13 shows a rear center portion of sensor 110. FIG. 14 is a cross-sectional view showing a cross section taken along the line B-B of sensor 110 shown in (a) in FIG. 13.

As shown in FIG. 14, shaft portion 114c of fastening member 114 is inserted in through hole 105 in electrically conductive non-woven fabric 102, electrode lead-out portion 10, and insulating member 140. Two clamping portions 114a and 114b are disposed on shaft portion 114c so as to clamp the periphery of through hole 105 in each of electrically conductive non-woven fabric 102, electrode lead-out portion 10, and insulating member 140 in the axial direction of shaft portion 114c. It should be noted that as in Embodiment 1, when fastening member 114 is a rivet, clamping portion 114a is a head portion of the rivet, shaft portion 114c is a body portion of the rivet, and clamping portion 114b is a portion formed like a head portion by crimping the tip of the body portion.

In addition, also in the present embodiment as in Embodiment 1, clamping portions 114a and 114b of fastening member 114 clamp metal wire 115 fixed to second base material 112 in the Z-axis direction together with electrode lead-out portion 10 as shown in FIGS. 13 and 14. With this, also in the present embodiment, the mechanical connection strength of the electrode connection structure including electrode lead-out portion 10 can be increased.

Here, in Embodiment 1, when clamping portions 114a and 114b of fastening member 114 clamp metal wire 115, metal wire 115 is strongly pressed against second base material 112 side by washer 101 disposed on the clamping portion 114b side of the pair of washers 101. As a result, by pressing washer 101 strongly against metal wire 115, the insulating coating formed on the surface of metal wire 115 may peel off.

However, in the present embodiment, since insulating member 140 is disposed so as to cover metal wire 115, it is possible to suppress washer 101 from abutting metal wire 115 directly. As a result, it is possible to suppress the coating of metal wire 115 from peeling off.

Figure 15:
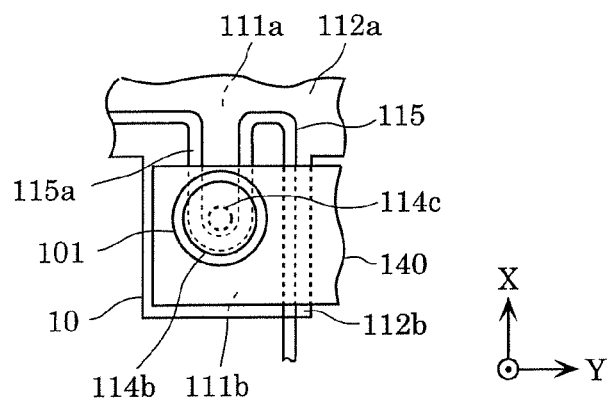
FIG. 15 is a diagram showing an example of a part where a metal wire is clamped in Embodiment 2.
Figure 16:
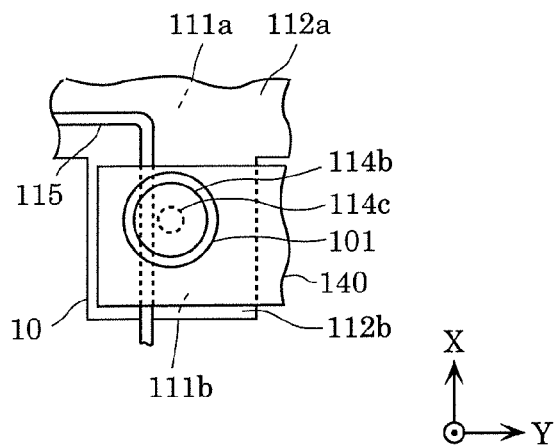
FIG. 16 is a diagram showing another example of the part where the metal wire is clamped in Embodiment 2.
Figure 17:
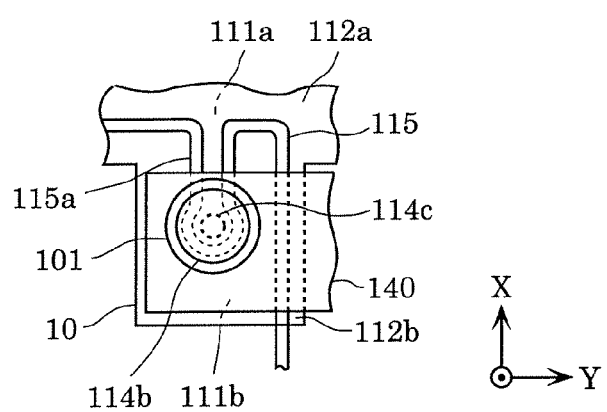
FIG. 17 is a diagram showing another example of the part where the metal wire is clamped in Embodiment 2.

FIG. 15 is a diagram showing an example of a part where metal wire 115 is clamped. Specifically, FIG. 15 is an enlarged view of a part of metal wire 115 around clamping portion 114b of fastening member 114 shown in (b) in FIG. 13. FIGS. 16 and 17 are diagrams showing another example of a part where metal wire 115 is clamped.

As shown in FIGS. 15 to 17, also in the present embodiment, since metal wire 115 is clamped by fastening member 114 as in Embodiment 1, the mechanical connection strength of the electrode connection structure can be increased. Furthermore, since insulating member 140 is disposed so as to cover metal wire 115 in the present embodiment, it is possible to suppress the coating of metal wire 115 from peeling off. That is, the electrode connection structure in the present embodiment is disposed between metal wire 115 and one of two clamping portions 114a and 114b, and includes insulating member 140 clamped in the axial direction by two clamping portions 114a and 114b. With this, since insulating member 140 is disposed as a cushioning material between metal wire 115 and one of two clamping portions 114a and 114b, even if clamping portion 114a or 114b strongly presses metal wire 115 to clamp the metal wire, it is possible to suppress metal wire 115 from being damaged. As a result, even if metal wire 115 is coated, it is possible to suppress the coating from peeling off.

In addition, the electrode connection structure in the present embodiment further includes insulating member 140 in addition to the configuration of Embodiment 1. This insulating member 140 is clamped together with two electrode lead-out portions 10 by two fastening members 114. Therefore, the mechanical connection strength of the electrode connection structure can be further increased, and the electrode connection structure can be made less prone to damage. That is, insulating member 140 is clamped together with first base material 111 and the like by two clamping portions 114a and 114b of fastening member 114 fixed to one end of cable 116. Furthermore, insulating member 140 is also clamped together with first base material 111 and the like by two clamping portions 114a and 114b of other fastening member 114 fixed to one end of other cable 116. Therefore, for example, when a force is applied to shaft portion 114c of fastening member 114 fixed to one end of one cable 116 by pulling one cable 116, insulating member 140 receives the tensile stress. Here, insulating member 140 is also clamped together with first base material 111, second base material 112, and the like by other fastening member 114. With this, first base material 111 and second base material 112 are reinforced. Therefore, insulating member 140 can suppress the movement of shaft portion 114c of fastening member 114 fixed to one end of one cable 116. Even if other cable 116 is pulled, insulating member 140 can similarly suppress the movement of shaft portion 114c of other fastening member 114 fixed to one end of cable 116. As a result, it is possible to suppress the periphery of first through hole 105 in electrode layer 113, the first base material, and the second base material from being torn by shaft portion 114c.

In addition, the electrode connection structure in the present embodiment includes first metal wire 115 and second metal wire 115 which are fixed to second base material 112, respectively, as in Embodiment 1. In one fastening member 114 of two fastening members 114 that clamp insulating member 140, two clamping portions 114a and 114b clamp first metal wire 115 fixed to second base material 112 in the axial direction of shaft portion 114c together with electrode layer 113, first base material 111, second base material 112, and insulating member 140. In addition, also in the other fastening member 114, two clamping portions 114a and 114b clamp second metal wire 115 fixed to second base material 112 in the axial direction of shaft portion 114c together with other electrode layer 113, first base material 111, second base material 112, and insulating member 140. It should be noted that first metal wire 115 and second metal wire 115 may be the same metal wire or may be different metal wires electrically insulated with each other.

With this, also in the present embodiment, since first metal wire 115 fixed to second base material 112 is clamped together with first base material 111 and the like by one of fastening members 114 as in Embodiment 1, the mechanical connection strength of the electrode connection structure can be increased, and the electrode connection structure can be made less prone to damage. In addition, similarly to first metal wire 115, second metal wire 115 fixed to second base material 112 is also clamped together with first base material 111 and the like by the other fastening member 114. Therefore, also by second metal wire 115, the mechanical connection strength of the electrode connection structure can be increased, and the electrode connection structure can be made less prone to damage.

In addition, in the present embodiment, insulating member 140 is clamped by two fastening members 114, but may be clamped by only one fastening member 114. In this case, insulating member 140 may be a metal washer having a surface with the electrical insulation.

It should be noted that since the electrode connection structure according to the present embodiment includes all the components of the electrode connection structure according to Embodiment 1, not only the working effects unique to the present embodiment but also the same working effects as in Embodiment 1 are obtained.

Embodiment 3

In the electrode connection structure according to the present embodiment, instead of clamping metal wire 115 by fastening member 114 as in Embodiment 1 described above, the mechanical connection strength of the electrode connection structure is increased by clamping insulating member 140 by a plurality of fastening members 114 as in Embodiment 2. Hereinafter, points of the electrode connection structure according to the present embodiment different from those of Embodiment 1 will be described, and detailed description of the same configurations as those of Embodiment 1 or 2 will be omitted.

Figure 18:
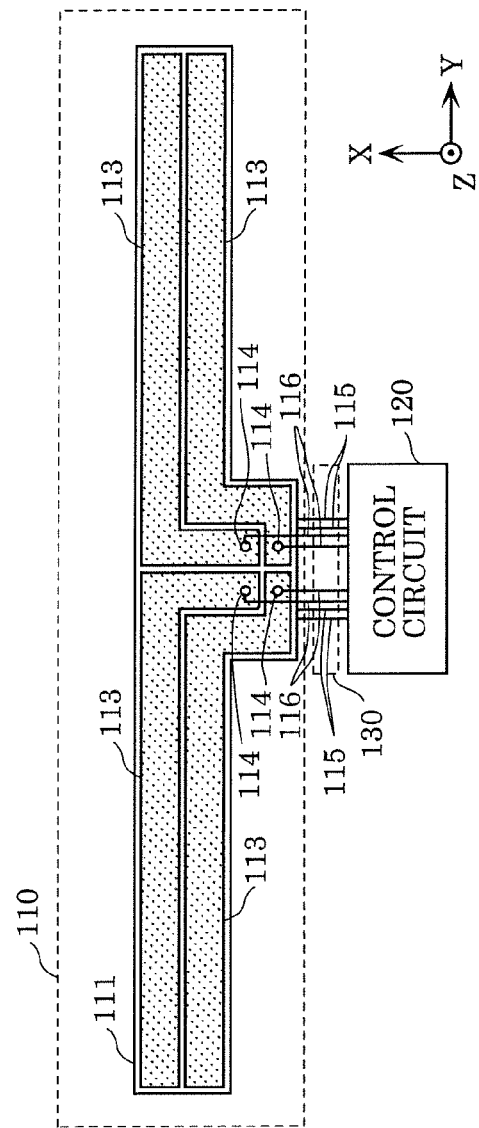
FIG. 18 is a front view of the grip sensor according to Embodiment 3.
Figure 19:
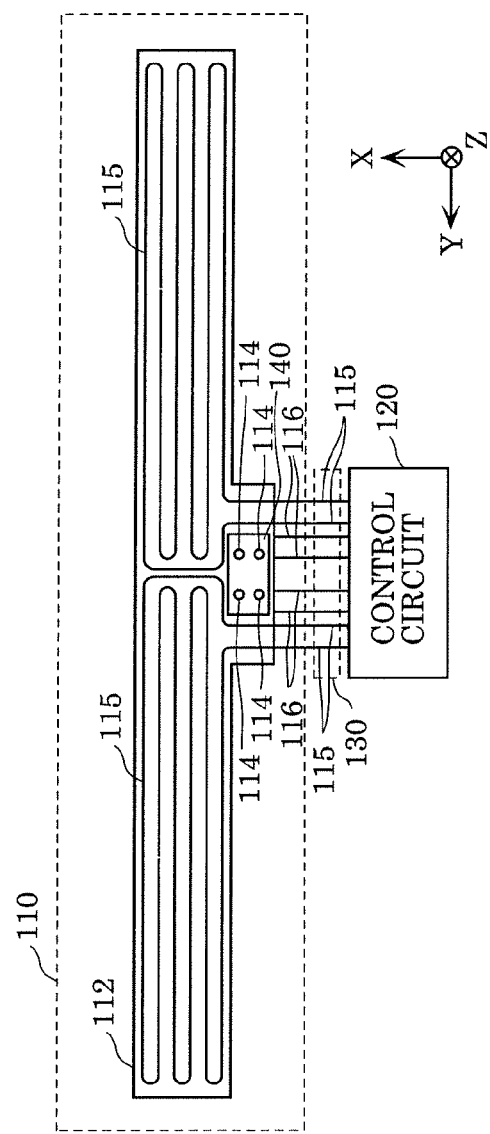
FIG. 19 is a rear view of the grip sensor according to Embodiment 3.

FIG. 18 is a front view of grip sensor 100 according to the present embodiment. FIG. 19 is a rear view of grip sensor 100 according to the present embodiment.

As shown in FIGS. 18 and 19, grip sensor 100 includes sensor 110, control circuit 120, and harness 130, as in Embodiments 1 and 2. Here, in sensor 110 according to the present embodiment, two fastening members 114 are arranged in each of the X-axis direction and the Y-axis direction as shown in FIG. 18. That is, four fastening members 114 are disposed in a matrix consisting of two columns in the X-axis direction and two rows in the Y-axis direction. In addition, one end side of each of four electrode layers 113 formed on first base material 111 protrudes toward the negative side in the X-axis direction so that four fastening members 114 are disposed in the above matrix.

Furthermore, in the present embodiment, insulating member 140 is disposed on the front surface of second base material 112 (the surface on the negative side in the Z-axis direction) as shown in FIG. 19. This insulating member 140 is clamped together with electrode layer 113, first base material 111, and second base material 112 by four fastening members 114. Here, in the present embodiment, metal wire 115 is not clamped by fastening member 114. Therefore, it is possible to suppress the coating of metal wire 115 from being peeled off by being clamped by fastening member 114.

Figure 20:
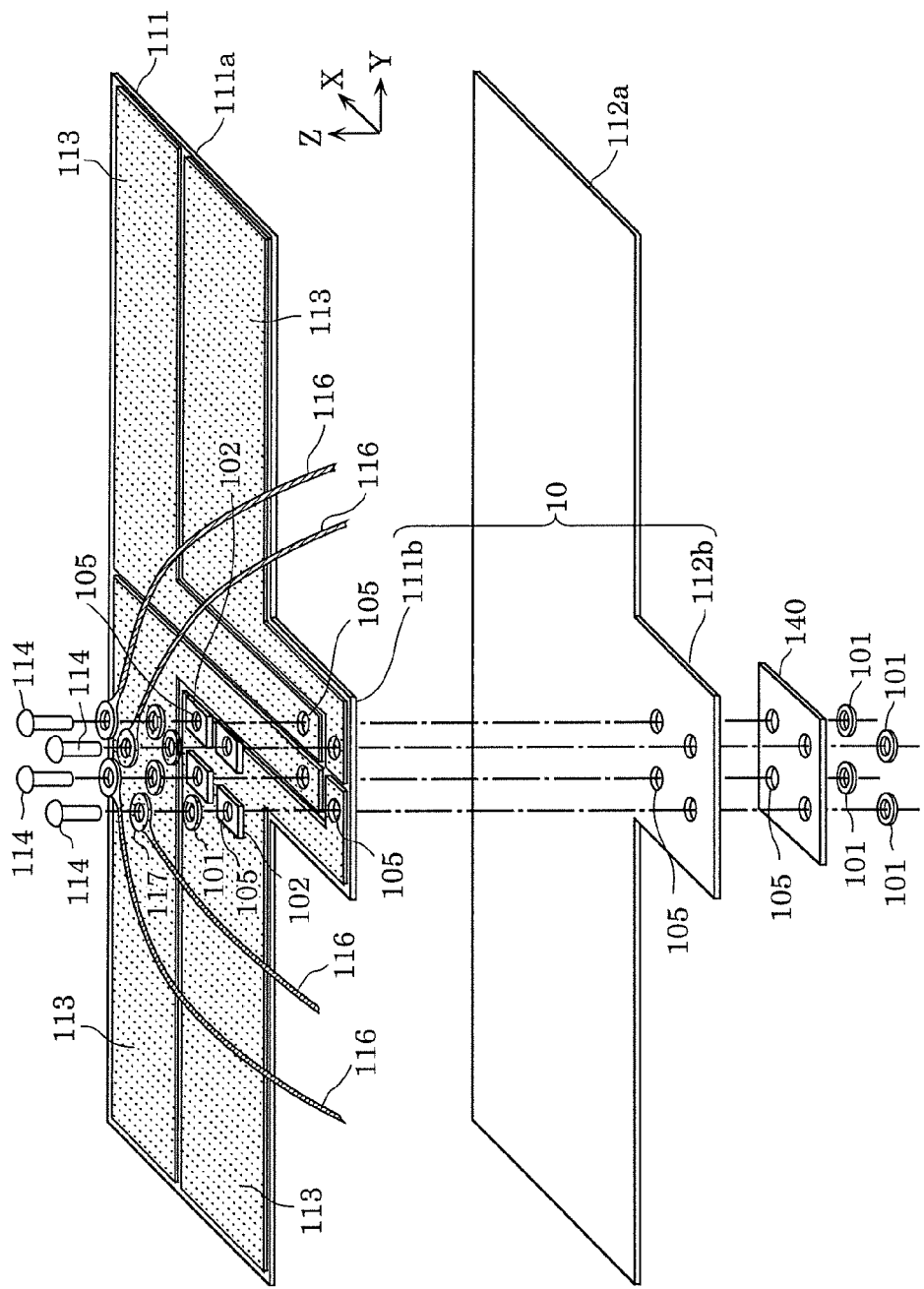
FIG. 20 is an exploded perspective view of the electrode connection structure according to Embodiment 3.

FIG. 20 is an exploded perspective view of sensor 110 in the present embodiment.

In the present embodiment, first base material 111 does not include four first convex portions 111b as in Embodiments 1 and 2, but includes only one first convex portion 111b. That is, first base material 111 includes elongate first main base material 111a, and one first convex portion 111b which protrudes from first main base material 111a. Specifically, one first convex portion 111b protrudes from the substantially center of the side of first main base material 111a on the negative side in the X-axis direction to the negative side in the X-axis direction. One end side of each of four electrode layers 113 is formed in this one first convex portion 111b. Through-holes 105 are formed in the four portions of first convex portion 111b, that is, in the portions where one ends of four electrode layers 113 are formed, respectively.

Similar to first base material 111, second base material 112 has only one second convex portion 112b. That is, second base material 112 includes second main base material 112a facing first main base material 111a, and one second convex portion 112b protruding from second main base material 112a and facing one first convex portion 111b. Specifically, similar to first convex portion 111b, one second convex portion 112b protrudes from the substantially center of the side of second main base material 112a on the negative side in the X-axis direction to the negative side in the X-axis direction. In addition, four through holes 105 are formed in second convex portion 112b.

Such first base material 111 and second base material 112 are stacked via a double-sided tape with through holes 105 formed in the respective base materials disposed to communicate with each other. At this time, the rear surface of first base material 111 and the rear surface of second base material 112 (that is, the surface on which metal wire 115 is not sewn) are joined by a double-sided tape. With this, first base material 111 and second base material 112 are bonded together. It should be noted that through hole 105 may be formed by drilling first base material 111 and second base material 112 after they are stacked via the double-sided tape. By such bonding, electrode lead-out portion 10 including first convex portion 111b on which electrode layer 113 is formed and second convex portion 112b that is bonded together to face first convex portion 111b is configured.

In addition, in the order of electrically conductive non-woven fabric 102, washer 101, and cable terminal 117 from the electrode layer 113 side, these members are disposed to be stacked in the periphery of through hole 105 in each of four electrode layers 113. At this time, these members are disposed so that the respective holes communicate with each other.

Furthermore, in the present embodiment, insulating member 140 is disposed on the front surface of second convex portion 112b of second base material 112. Also at this time, insulating member 140 is disposed so that four through holes 105 of insulating member 140 communicate with four through holes 105 of second convex portion 112b, respectively. Then, washer 101 is disposed in the periphery of each of four through holes 105 on the surface opposite to the second base material 112 side (that is, the front surface) of insulating member 140. Also at this time, washer 101 is disposed so that the hole of washer 101 communicates with through hole 105.

Then, the respective axes of four fastening members 114 are inserted in the holes of cable terminal 117 and the pair of washers 101, and respective through holes 105 of electrode lead-out portion 10 and insulating member 140, for example, from the positive side to the negative side in the Z-axis direction. Furthermore, the tip of the inserted fastening member 114 is crimped while protruding from washer 101 on the negative side in the Z-axis direction.

Figure 21:
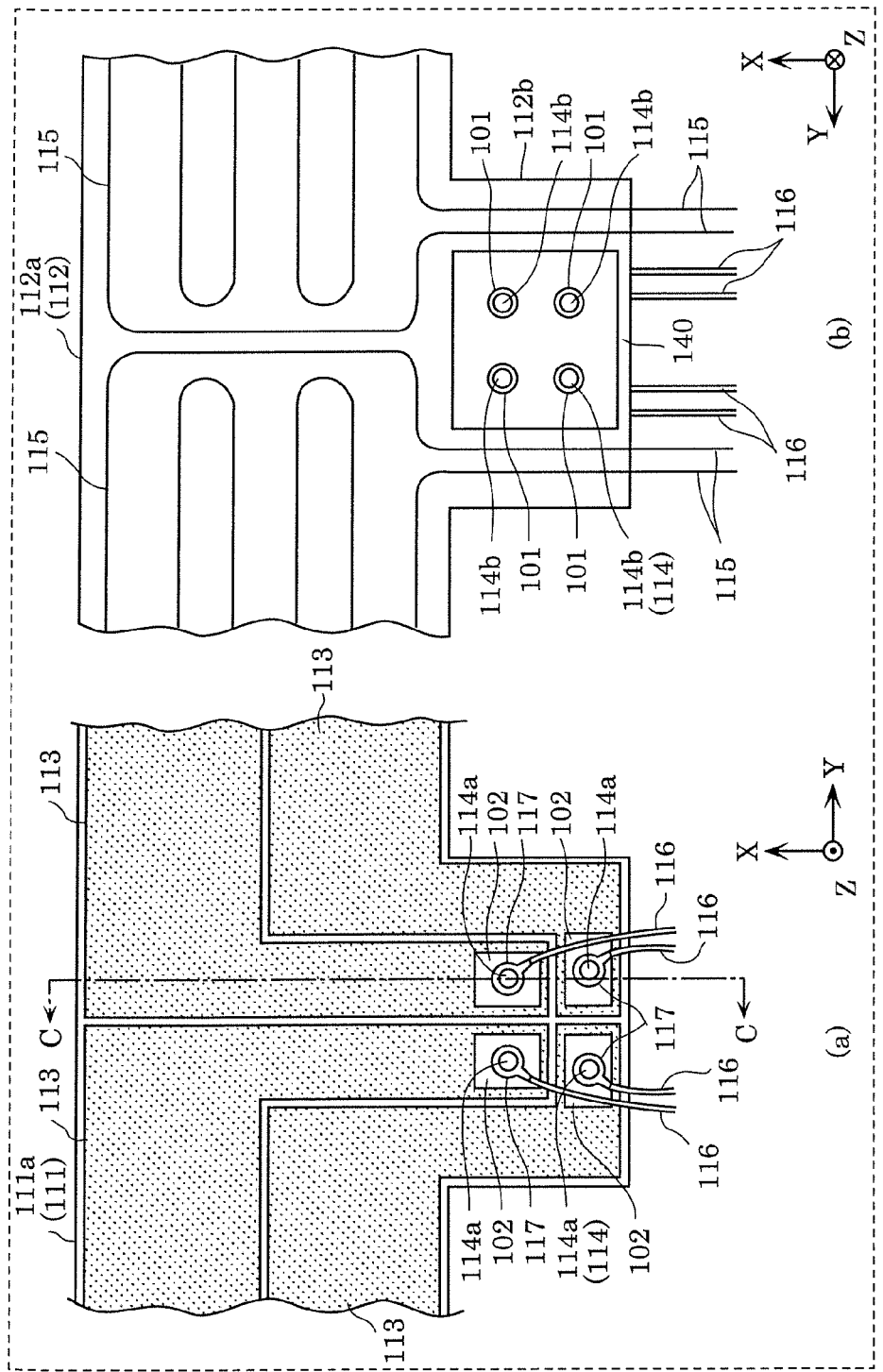
FIG. 21 is a diagram showing a central portion of the sensor according to Embodiment 3.
Figure 22:
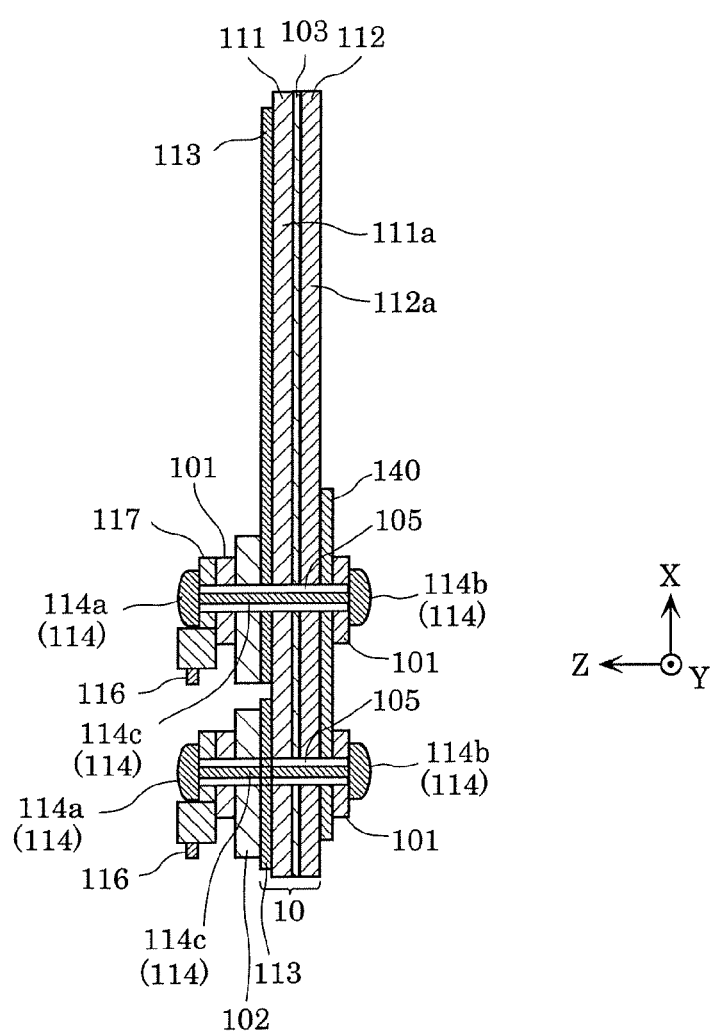
FIG. 22 is a cross-sectional view showing a cross section of the sensor taken along the line C-C of FIG. 21.

FIG. 21 is a diagram showing a central portion of sensor 110 according to the present embodiment. Specifically, (a) in FIG. 21 shows a front center portion of sensor 110, and (b) in FIG. 21 shows a rear center portion of sensor 110. FIG. 22 is a cross-sectional view showing a cross section taken along line C-C of sensor 110 shown in (a) in FIG. 21.

As shown in FIG. 22, shaft portion 114c of fastening member 114 is inserted in the respective holes of cable terminal 117 and washer 101, and further inserted in through holes 105 of electrically conductive non-woven fabric 102, electrode lead-out portion 10, and insulating member 140. Furthermore, shaft portion 114c is inserted in the hole of washer 101 disposed in insulating member 140.

Two clamping portions 114a and 114b are disposed on shaft portion 114c. These two clamping portions 114a and 114b are clamp the periphery of through hole 105 in each of electrically conductive non-woven fabric 102, electrode lead-out portion 10, and insulating member 140 via cable terminal 117 and a pair of washers 101 in the axial direction of shaft portion 114c. It should be noted that as in Embodiment 1, when fastening member 114 is a rivet, clamping portion 114a is a head portion of the rivet, shaft portion 114c is a body portion of the rivet, and clamping portion 114b is a portion formed like a head portion by crimping the tip of the body portion.

Here, in the present embodiment, unlike the first and second embodiments, clamping portions 114a and 114b of fastening member 114 clamp no metal wire 115 fixed to second base material 112 as shown in (b) in FIG. 21 and FIG. 22. That is, metal wire 115 is not strongly pressed to the second base material 112 side by clamping portion 114b and washer 101. This can suppress the coating of metal wire 115 from peeling off.

In addition, in the present embodiment, insulating member 140 is clamped together with electrode lead-out portion 10 by four fastening members 114. In other words, insulating member 140 is fastened together with electrode lead-out portion 10 by the four fastening members.

With this, in the present embodiment, the mechanical connection strength of the electrode connection structure including electrode lead-out portion 10 can be increased. For example, when a force is applied to shaft portion 114c of fastening member 114 fixed to cable terminal 117 by pulling cable 116 connected to cable terminal 117, insulating member 140 receives the tensile stress. Since this insulating member 140 is fastened together with electrode lead-out portion 10 by four fastening members 114 as described above, it reinforces second base material 112 and insulating member 140 can suppress the movement of shaft portion 114c of fastening member 114 fixed to cable terminal 117. As a result, the periphery of through hole 105 in electrode layer 113, first base material 111, and second base material 112 can be suppressed from being torn by shaft portion 114c.

In the present embodiment, the electrode connection structure includes four electrode layers 113 and four fastening members 114, but the number thereof is not limited to four, and it may be any number of two or more. That is, the electrode connection structure according to the present embodiment includes at least two electrode layers 113; at least two fastening members 114 corresponding to electrode layers 113; and insulating member 140 clamped by fastening members 114. At least two electrode layers 113 include, for example, first electrode layer 113 and second electrode layer 113 among four electrode layers 113 described above. In addition, at least two fastening members 114 include, for example, first fastening member 114 and second fastening member 114 among four fastening members 114 described above. By these fastening members 114, one ends of cables 116 that are the first electric wire and the second electric wire are fastened to first base material 111 and second base material 112, respectively.

Therefore, the electrode connection structure in the present embodiment includes first base material 111; first electrode layer 113 and second electrode layer 113 formed on one surface of first base material 111; second base material 112 disposed on the surface opposite to the one surface of first base material 111; first fastening member 114 for fastening one end of cable 116 that is a first electric wire to first base material 111 and second base material 112; second fastening member 114 for fastening one end of cable 116 that is a second electric wire to first base material 111 and second base material 112; and insulating member 140.

First fastening member 114 includes first shaft portion 114c inserted in first through hole 105 penetrating first electrode layer 113, first base material 111, second base material 112, and insulating member 140; and two first clamping portions 114a and 114b disposed in first shaft portion 114c so as to clamp the periphery of first through hole 105 in each of first electrode layer 113, first base material 111, second base material 112, and insulating member 140 in the axial direction of first shaft portion 114c.

Similarly, second fastening member 114 includes second shaft portion 114c inserted in second through hole 105 penetrating second electrode layer 113, first base material 111, second base material 112, and insulating member 140; and two second clamping portions 114a and 114b disposed in second shaft portion 114c so as to clamp the periphery of second through hole 105 in each of second electrode layer 113, first base material 111, second base material 112 and insulating member 140 in the axial direction of second shaft portion 114c. One end of cable 116 that is the first electric wire is fixed to first fastening member 114 while being electrically connected to first electrode layer 113, and one end of cable 116 that is the second electric wire is fixed to second fastening member 114 while being electrically connected to second electrode layer 113.

With this, insulating member 140 is clamped together with first base material 111, second base material 112, and the like by two first clamping portions 114a and 114b of first fastening member 114 and two second clamping portions 114a and 114b of second fastening member 114. Therefore, the mechanical connection strength of the electrode connection structure can be increased, and the electrode connection structure can be made less prone to damage. That is, insulating member 140 is clamped together with first base material 111 and the like by two first clamping portions 114a and 114b of first fastening member 114 fixed to one end (specifically, cable terminal 117) of first electric wire such as cable 116. Furthermore, insulating member 140 is also clamped together with first base material 111 and the like by two second clamping portions 114a and 114b of second fastening member 114 fixed to one end (specifically, cable terminal 117) of second electric wire such as other cable 116. Therefore, for example, when a force is applied to first shaft portion 114c of first fastening member 114 fixed to one end of cable 116 by pulling cable 116 that is the first electric wire, insulating member 140 receives the tensile stress. Here, insulating member 140 is also clamped together with first base material 111, second base material 112, and the like by second fastening member 114. With this, first base material 111 and second base material 112 are reinforced. Therefore, insulating member 140 can suppress the movement of first shaft portion 114c of first fastening member 114 fixed to one end of cable 116 that is the first electric wire. Even if the second electric wire that is other cable 116 is pulled, insulating member 140 can similarly suppress the movement of second shaft portion 114c of second fastening member 114 fixed to one end of the second electric wire. As a result, it is possible to suppress the periphery of first through hole 105 in first electrode layer 113, the first base material, and the second base material from being torn by first shaft portion 114c. Similarly, it is possible to suppress the periphery of second through hole 105 in second electrode layer 113, the first base material, and the second base material from being torn by second shaft portion 114c.

Here, in the present embodiment, insulating member 140 is disposed between second base material 112 and four clamping portions 114b. That is, insulating member 140 is disposed between second base material 112 and one of two first clamping portions 114a and 114b, and between second base material 112 and one of two second clamping portions 114a and 114b.

With this, since insulating member 140 is disposed as a cushioning material between second base material 112 and clamping portion 114b, even if second base material 112 is strongly pressed due to clamping portion 114b clamping second base material 112, the local pressure on second base material 112 can be relieved.

In Embodiment 3, insulating member 140 is disposed on the front surface (the surface on the negative side in the Z-axis direction) of second base material 112, but may be disposed on the back surface (the surface on the positive side in the Z-axis direction) of second base material 112.

Embodiment 4

In the electrode connection structure of Embodiment 3, the mechanical connection strength can be increased as described above. That is, insulating member 140 is clamped together with first base material 111 and the like by respective two clamping portions 114a and 114b of four fastening members 114. Therefore, even if cable 116 fixed to fastening member 114 is pulled, the periphery of first through hole 105 in electrode layer 113, first base material 111, and second base material 112 can be suppressed from being torn by shaft portion 114c of fastening member 114. However, metal wire 115 is not clamped together with insulating member 140, first base material 111, and the like by fastening member 114. Therefore, when metal wire 115 is pulled, the portion of second base material 112 to which metal wire 115 is sewn may be torn by metal wire 115. Alternatively, the portion may be deformed or damaged.

Thus, the electrode connection structure according to the present embodiment includes a banding member for suppressing metal wire 115 from being pulled. This can suppress second base material 112 from being torn.

Figure 23:
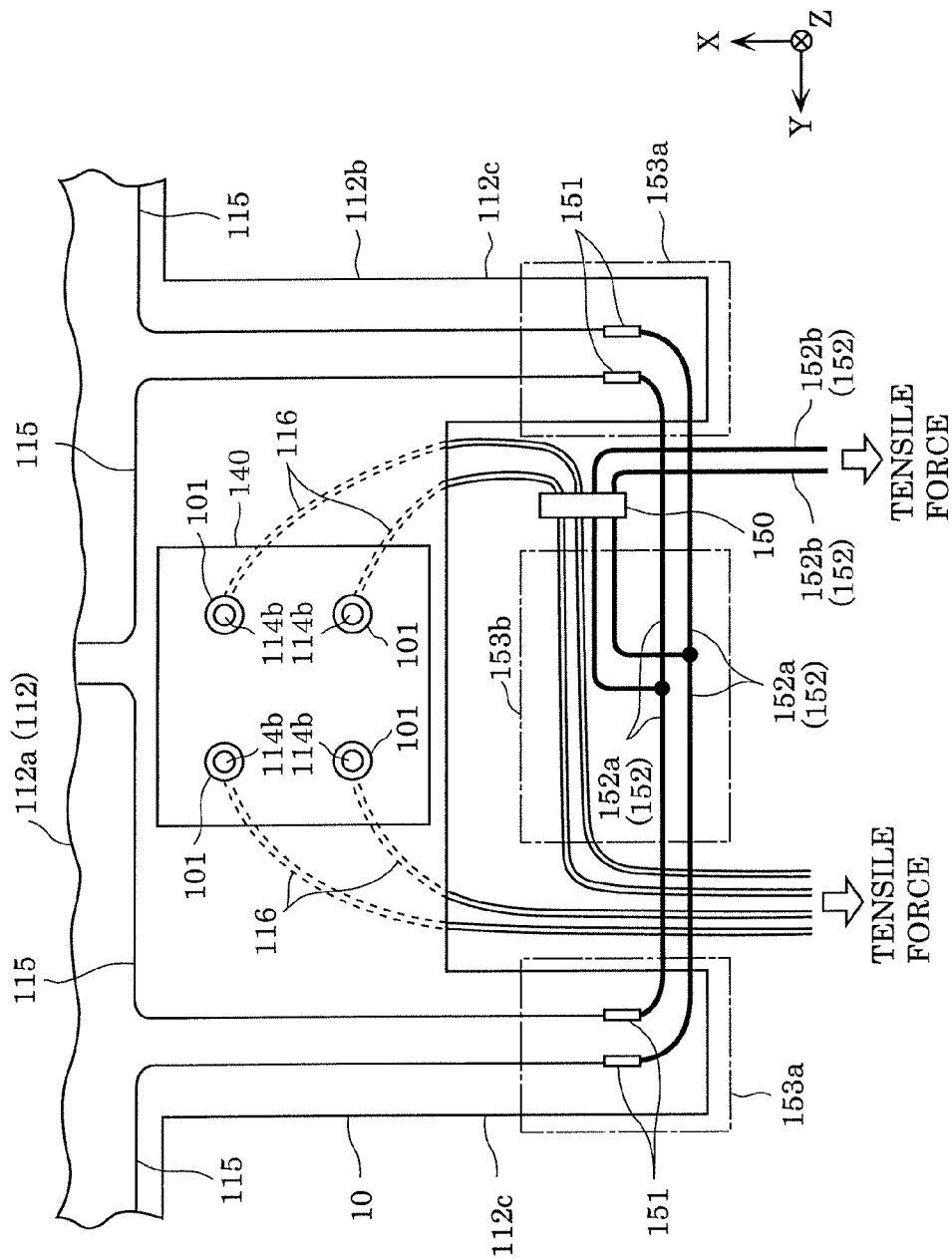
FIG. 23 is a diagram showing a part of the electrode connection structure according to Embodiment 4.

FIG. 23 is a diagram showing a part of the electrode connection structure according to Embodiment 4.

The electrode connection structure according to the present embodiment is different from the electrode connection structure according to Embodiment 3 in that it further includes four fastening members 151 each corresponding to a third fastening member, and banding member 150.

Each of four fastening members 151 is a member for fastening one end of cable 152 corresponding to the third electric wire to first base material 111 and second base material 112.

Banding member 150 is a member that bands at least one of four cables 116 corresponding to either the first electric wire or the second electric wire and cable 152.

Specifically, in the present embodiment, protruding portions protruding toward the negative side in the X axis direction are formed at both ends in the Y-axis direction of electrode lead-out portions 10 of first base material 111 and second base material 112. That is, protruding portions 112c protruding toward the negative side in the X-axis direction are formed at both ends in the Y-axis direction of second convex portion 112b of second base material 112. Both ends of each of two metal wires 115 are fixed by being sewn to protruding portion 112c. Then, each of both ends of metal wire 115 is electrically and structurally connected to cable 152 by fastening member 151. That is, fastening member 151 fastens cable 152 to first base material 111 and second base material 112 by electrically and structurally connecting one end of cable 152 to one end of metal wire 115.

In addition, in the present embodiment, each of two cables 152 includes core cable 152b and two end cables 152a formed by branching the tip side of core cable 152b. Each of two end cables 152a is connected to the end of metal wire 115 sewn to protruding portion 112c via fastening member 151. For example, fastening member 151 includes a crimp terminal for connecting the end of metal wire 115 and the end of terminal cable 152a, and solder for electrically sufficiently connecting and fixing the ends. In addition, the base end side of core cable 152b opposite to the tip end side is connected to control circuit 120. That is, though both ends of metal wire 115 are not sewn to second base material 112 and are directly connected to control circuit 120 in Embodiments 1 to 3, both ends of metal wire 115 are sewn to second base material 112 in the same manner as the other portions except the both ends in the present embodiment. Then, each of both ends of metal wire 115 is connected to control circuit 120 via cable 152.

Banding member 150 bands cable 116 connected to each of two fastening members 114 on the negative side in the Y-axis direction and core cable 152b of each of two cables 152. Such banding member 150 may be, for example, a banding band, a vinyl tape, or a heat shrink tube. When a banding band is used for banding member 150, two cables 116 and two core cables 152b can be banded easily by using the banding band in the final step of manufacturing the electrode connection structure or grip sensor 100. In addition, since the banding strength is high, it is possible to effectively suppress the deviation of two cables 116 and two core cables 152b that are banded together. In addition, even if any of two cables 116 and two core cables 152b is pulled, banding member 150 can be suppressed from sliding and deforming. In addition, the width of the banding band is generally shorter than the width of the vinyl tape. Therefore, even if the width of the portion of two cables 116 and two core cables 152b where they can be banded is short, their cables can be easily banded using a banding band for banding member 150.

It should be noted that the distance in cable 116 from the part banded by banding member 150 to fastening member 114 is shorter than the distance in cable 152 from the part banded by banding member 150 to fastening member 151.

In addition, the electrode connection structure according to the present embodiment may include covering member 153a that covers two fastening members 151 disposed on protruding portion 112c of second base material 112 and covering member 153b that covers each of the branched portions of the two cables 152. By these covering members 153a and 153b, fastening members 151 and the branched portions can be protected. It should be noted that in FIG. 23, only the simplified outer periphery of covering members 153a and 153b are shown by a dashed-dotted line in order to make fastening member 151 and the branched portion easy to understand.

In such electrode connection structure according to the present embodiment, since four fastening members 114 fasten insulating member 140 together with electrode lead-out portion 10 as in Embodiment 3, the mechanical strength of the peripheral portion of each of four fastening members 114 in electrode lead-out portion 10 is high. Therefore, even if each of four cables 116 is pulled, the peripheral portion of each of four fastening members 114 in electrode lead-out portion 10 can be suppressed from being torn by the fastening member 114.

On the other hand, the mechanical strength of the peripheral portion of each of two fastening members 151 in protruding portion 112c of second base material 112 is weaker than the mechanical strength of the peripheral portion of fastening member 114 in second base material 112. That is, when end cable 152a is pulled, the pulling force is transmitted to the end of metal wire 115 via fastening member 151. As a result, metal wire 115 sewn to protruding portion 112c is pulled due to the pulling force, and protruding portion 112c may be torn by metal wire 115.

Therefore, the electrode connection structure according to the present embodiment includes banding member 150 so that even if cable 152 connecting to fastening member 151 is pulled, the pulling force is not transmitted to the peripheral portions of each of two fastening members 151 in protruding portion 112c.

Specifically, when core cable 152b of each of two cables 152 is pulled, the pulling force is transmitted to fastening member 114 via banding member 150 and cable 116. That is, when the part of core cable 152b on the control circuit 120 side is pulled, the pulling force is transmitted to fastening member 114, not to fastening member 151 on the metal wire 115 side.

Therefore, even if the pulling force is transmitted to fastening member 114 by pulling core cable 152b, the peripheral portion of fastening member 114 in electrode lead-out portion 10 has a high mechanical strength, so that the peripheral portion can be suppressed from being torn. That is, even if core cable 152b of each of two cables 152 is pulled, the pulling force can be suppressed from being transmitted to fastening member 151 on the metal wire 115 side to protect protruding portion 112c of second base material 112.

The electrode connection structure according to the present embodiment has a configuration in which banding member 150 is included in the electrode connection structure according to Embodiment 3, but it may has a configuration in which banding member 150 is included in the electrode connection structure according to Embodiment 1 or 2. In this case, the electrode connection structure includes, for example, the configuration of the electrode connection structure of Embodiment 1, another fastening member, and a banding member. The other fastening member is a member for fastening one end of another electric wire different from cable 116 (that is, the electric wire) to first base material 111 and second base material 112. The banding member is a member that bands cable 116 and another electric wire. Specifically, the other fastening member fastens the other electric wire to first base material 111 and second base material 112 by electrically and structurally connecting one end of the other electric wire to one end of metal wire 115. It should be noted that the other electric wire and the other fastening member correspond to cable 152 and fastening member 151 in the present embodiments.

Even with such a configuration, the same effect as that of the present embodiment can be obtained.

Other Modifications

The electrode connection structure according to the present disclosure has been described above based on each of the embodiments described above, but the present disclosure is not limited to these embodiments. Various modifications that one of skilled in the art may conceive may be included in the scope of the present disclosure without departing from the spirit of the present disclosure.

For example, although metal wire 115 in each of the embodiments described above is used as a heater element, it may be used for other purposes. For example, metal wire 115 may be used as a disturbance noise detection electrode. That is, metal wire 115 having an electrically insulated surface is a disturbance noise detection electrode for detecting disturbance noise with respect to the signal detected in electrode layer 113. In this case, control circuit 120 acquires the disturbance noise signal from metal wire 115 that is the disturbance noise detection electrode. Then, control circuit 120 corrects the output signal of electrode layer 113, for example, by subtracting the value indicated by the disturbance noise signal from the value indicated by the output signal of electrode layer 113. With this, the measurement value based on the electrostatic capacitance generated in electrode layer 113 can be appropriately acquired while suppressing the influence of disturbance noise. As a result, control circuit 120 can detect the grip of rim 210 by the hand more accurately. It should be noted that not only one of the heater element and the disturbance noise detection electrode but also both of them may be disposed on second base material 112. In this case, two clamping portions 114a and 114b may clamp only one of the metal wire of the heater element and the metal wire of the disturbance noise detection electrode, or may clamp both of them. In addition, metal wire 115 may be used as a functional element other than the heater element and the disturbance noise detection electrode.

In addition, although metal wire 115 in each of the embodiments described above is used as a heater element, it may be provided exclusively for reinforcing second base material 112, separately from the heater element or separately from the disturbance noise detection electrode. Furthermore, when neither the heater element nor the disturbance noise detection electrode is required, metal wire 115 may be provided only on electrode lead-out portion 10 where second base material 112 needs to be reinforced and the periphery of electrode lead-out portion 10. In these cases, the length of metal wire 115 may be set to the minimum required.

In addition, although metal wire 115 in each of the embodiments described above is fixed to second base material 112 by being sewn to second base material 112, it may be fixed to second base material 112 by another method.

In addition, when metal wire 115 in each of the embodiments described above is used as a heater element or a disturbance noise detection electrode, such a configuration that metal wire 115 is directly connected to control circuit 120 is shown in each of the embodiments described above, for example, as shown in FIG. 19, but a configuration is not limited thereto. That is, the heater element or the disturbance noise detection electrode may be connected to an external circuit such as control circuit 120 by the electrode connection structure described in each of the embodiments described above.

In addition, the electrode connection structure in each of the embodiments described above is provided in grip sensor 100, but it is not limited to grip sensor 100 and it may be provided in any device as long as it is a device used by connecting one end of an electric wire to an electrode.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following Japanese Patent Applications including specification, drawings and claims are incorporated herein by reference in their entirety: Japanese Patent Application No. 2018-082375 filed on Apr. 23, 2018 and Japanese Patent Application No. 2018-204579 filed on Oct. 31, 2018.

INDUSTRIAL APPLICABILITY

The electrode connection structure of the present disclosure has an effect of being less likely to be damaged, and is applicable to, for example, a grip sensor or the like disposed on a steering wheel or a door handle of a vehicle, a grip of a motorcycle, or the like.

What is claimed is:

1. An electrode connection structure, comprising:
   a first base material;
   a first electrode layer and a second electrode layer that are located on one surface of the first base material;
   a second base material disposed on a surface opposite to the one surface of the first base material;
   a first fastening member that fastens one end of a first electric wire to the first base material and the second base material;
   a second fastening member that fastens one end of a second electric wire to the first base material and the second base material; and
   an insulating member, wherein
   the first fastening member includes:
      a first shaft portion inserted in a first through hole penetrating the first electrode layer, the first base material, the second base material, and the insulating member; and
      two first clamping portions disposed on the first shaft portion so as to clamp a periphery of the first through hole in each of the first electrode layer, the first base material, the second base material, and the insulating member in an axial direction of the first shaft portion,
   the second fastening member includes:
      a second shaft portion inserted in a second through hole penetrating the second electrode layer, the first base material, the second base material, and the insulating member; and
      two second clamping portions disposed on the second shaft portion so as to clamp a periphery of the second through hole in each of the second electrode layer, the first base material, the second base material, and the insulating member in an axial direction of the second shaft portion,
   the one end of the first electric wire is fixed to the first fastening member while being electrically connected to the first electrode layer, and
   the one end of the second electric wire is fixed to the second fastening member while being electrically connected to the second electrode layer.

2. The electrode connection structure according to claim 1, wherein
   the insulating member is a resin sheet, a rubber sheet, a non-woven fabric, or a metal sheet having a surface with an insulating property.

3. The electrode connection structure according to claim 1, wherein
   the insulating member is disposed between the second base material and one of the two first clamping portions and between the second base material and one of the two second clamping portions.

4. The electrode connection structure according to claim 1, further comprising:
   a first metal wire and a second metal wire each fixed to the second base material, wherein
   the two first clamping portions clamp the first metal wire fixed to the second base material in the axial direction of the first shaft portion together with the first electrode layer, the first base material, the second base material, and the insulating member, and
   the two second clamping portions clamp the second metal wire fixed to the second base material in the axial direction of the second shaft portion together with the second electrode layer, the first base material, the second base material, and the insulating member.

5. The electrode connection structure according to claim 4, wherein
   the first base material includes a first main base material and a first convex portion protruding from the first main base material,
   the second base material includes a second main base material facing the first main base material, and a second convex portion protruding from the second main base material and facing the first convex portion,
   each of the first electrode layer and the second electrode layer is disposed over a range including at least a part of the first main base material and at least a part of the first convex portion,
   the first shaft portion of the first fastening member is inserted in the first through hole penetrating the first electrode layer, the first convex portion, the second convex portion, and the insulating member,
   the second shaft portion of the second fastening member is inserted in the second through hole penetrating the second electrode layer, the first convex portion, the second convex portion, and the insulating member, and
   the first metal wire and the second metal wire are fixed to the second main base material.

6. The electrode connection structure according to claim 5, wherein
   each of the first metal wire and the second metal wire includes a folded-back portion that is substantially U-shaped,
   both ends of the folded-back portion are fixed to the second main base material,
   a central portion of the folded-back portion is fixed to the second convex portion, and
   the first shaft portion of the first fastening member or the second shaft portion of the second fastening member is disposed inward of the folded-back portion.

7. The electrode connection structure according to claim 4, wherein
   each of the first metal wire and the second metal wire having an electrically insulated surface is a heater element that generates heat by a current flowing through the metal wire to warm the electrode connection structure.

8. The electrode connection structure according to claim 4, wherein
   each of the first metal wire and the second metal wire having an electrically insulated surface is a disturbance noise detection electrode that detects disturbance noise with respect to signals detected in the first electrode layer and the second electrode layer.

9. The electrode connection structure according to claim 1, wherein
one of the two first clamping portions clamps a conductive first non-woven fabric between the one of the two first clamping portions and the first electrode layer, and
one of the two second clamping portions clamps a conductive second non-woven fabric between the one of the two second clamping portions and the second electrode layer.

10. The electrode connection structure according to claim 1, further comprising:
a third fastening member that fastens one end of a third electric wire to the first base material and the second base material; and
a banding member that bands at least one of the first electric wire or the second electric wire and the third electric wire.

11. The electrode connection structure according to claim 10, further comprising:
a metal wire fixed to the second base material, wherein
the third fastening member fastens the third electric wire to the first base material and the second base material by electrically and structurally connecting one end of the third electric wire to one end of the metal wire.

12. An electrode connection structure, comprising:
a first base material;
an electrode layer located on one surface of the first base material;
a second base material disposed on a surface opposite to the one surface of the first base material;
a metal wire fixed to the second base material; and
a fastening member that fastens one end of an electric wire to the first base material and the second base material, wherein
the fastening member includes:
a shaft portion inserted in a through hole penetrating the electrode layer, the first base material and the second base material; and
two clamping portions disposed on the shaft portion so as to clamp a periphery of the through hole in each of the electrode layer, the first base material, and the second base material in an axial direction of the shaft portion,
the one end of the electric wire is fixed to the fastening member while being electrically connected to the electrode layer, and
the two clamping portions clamp the metal wire fixed to the second base material in the axial direction together with the electrode layer, the first base material, and the second base material.

13. The electrode connection structure according to claim 12, further comprising:
an insulating member disposed between the metal wire and one of the two clamping portions and clamped in the axial direction by the two clamping portions.

14. The electrode connection structure according to claim 13, wherein
the insulating member is a resin sheet.

15. The electrode connection structure according to claim 14,
the insulating member is a metal washer having a surface with an insulating property.

16. The electrode connection structure according to claim 12, further comprising:
another fastening member that fastens one end of another electric wire different from the electric wire to the first base material and the second base material; and
a banding member that bands the electric wire and the other electric wire.

17. The electrode connection structure according to claim 16, wherein
the other fastening member fastens the other electric wire to the first base material and the second base material by electrically and structurally connecting one end of the other electric wire to one end of the metal wire.

18. An electrode connection method, comprising:
disposing a second base material on a surface opposite to one surface of a first base material having the one surface on which a first electrode layer and a second electrode layer are formed;
disposing an insulating member on the second base material;
fastening one end of a first electric wire to the first base material and the second base material by a first fastening member having a first shaft portion and two first clamping portions disposed on the first shaft portion; and
fastening one end of a second electric wire to the first base material and the second base material by a second fastening member having a second shaft portion and two second clamping portions disposed on the second shaft portion,
the fastening by the first fastening member including:
inserting the first shaft portion in a first through hole that penetrates the first electrode layer, the first base material, the second base material, and the insulating member;
clamping a periphery of the first through hole in each of the first electrode layer, the first base material, the second base material, and the insulating member by the two first clamping portions in an axial direction of the first shaft portion; and
fixing the one end of the first electric wire to the first fastening member while being electrically connected to the first electrode layer,
the fastening by the second fastening member including:
inserting the second shaft portion in a second through hole that penetrates the second electrode layer, the first base material, the second base material, and the insulating member;
clamping a periphery of the second through hole in each of the second electrode layer, the first base material, the second base material, and the insulating member by the two second clamping portions in an axial direction of the second shaft portion; and
fixing the one end of the second electric wire to the second fastening member while being electrically connected to the second electrode layer.

* * * * *